US012809013B2

(12) United States Patent
Sauer

(10) Patent No.: US 12,809,013 B2
(45) Date of Patent: Nov. 24, 2026

(54) RECEIVER PROCESSING CIRCUITRY FOR MOTION DETECTION AND RELATED SYSTEMS, METHODS, AND APPARATUSES

(71) Applicant: Microchip Technology Incorporated, Chandler, AZ (US)

(72) Inventor: Peter Sauer, Karlsruhe (DE)

(73) Assignee: Microchip Technology Incorporated, Chandler, AZ (US)

( * ) Notice: Subject to any disclaimer, the term of this patent is extended or adjusted under 35 U.S.C. 154(b) by 196 days.

(21) Appl. No.: 18/474,015

(22) Filed: Sep. 25, 2023

(65) Prior Publication Data

US 2024/0027599 A1 Jan. 25, 2024

Related U.S. Application Data

(63) Continuation-in-part of application No. 17/456,496, filed on Nov. 24, 2021.

(Continued)

(51) Int. Cl.

*G01S 13/58* (2006.01)
*G01S 7/292* (2006.01)
*G01S 13/62* (2006.01)

(52) U.S. Cl.

CPC ............ *G01S 13/581* (2013.01); *G01S 7/292* (2013.01); *G01S 13/62* (2013.01)

(58) Field of Classification Search

CPC combination set(s) only.
See application file for complete search history.

(56) References Cited

U.S. PATENT DOCUMENTS 5,960,097 A 9/1999 Pfeiffer et al.
8,786,489 B2 7/2014 Patrick (Continued)

FOREIGN PATENT DOCUMENTS

AU 2009227717 A1 9/2009
CN 101297215 A 10/2008

(Continued)

OTHER PUBLICATIONS

International Search Report from International Application No. PCT/US2021/072599, mailed Mar. 18, 2022, 4 pages.

(Continued)

*Primary Examiner* — Olumide Ajibade Akonai
*Assistant Examiner* — Eric K Hodac
(74) *Attorney, Agent, or Firm* — TraskBritt

(57) ABSTRACT

Motion detection apparatuses are disclosed. The motion detection may be performed using one or more of a sub-window of a predetermined time window, a predetermined threshold value that is settable responsive to changes in one or more environmental factors, or a detection trigger. An apparatus includes a processor and an analog-to-digital converter (ADC) circuitry to sample a reflected predetermined pattern signal to generate reflected predetermined pattern samples. The processor captures collections of the reflected predetermined pattern samples corresponding to a predetermined time window and determines a sum of the collections or sub-collections. The processor determines an average of magnitudes of the determined sum and determines that a moving object is detected responsive to a predetermined threshold value.

21 Claims, 16 Drawing Sheets

Related U.S. Application Data

(60) Provisional application No. 63/198,948, filed on Nov. 24, 2020.

(56) References Cited

U.S. PATENT DOCUMENTS

| | | | |
|---|---|---|---|
| 2007/0152871 A1 | 7/2007 | Puglia | |
| 2009/0295619 A1 | 12/2009 | Szajnowski | |
| 2011/0096954 A1 | 4/2011 | Dahl | |
| 2011/0234445 A1 | 9/2011 | Patrick | |
| 2016/0259037 A1 | 9/2016 | Molchanov et al. | |
| 2017/0269196 A1 | 9/2017 | Millar et al. | |
| 2018/0138993 A1 | 5/2018 | Kchler et al. | |
| 2019/0178980 A1 | 6/2019 | Zhang et al. | |
| 2019/0190528 A1 | 6/2019 | Lassen | |
| 2020/0073480 A1 | 3/2020 | Hof et al. | |
| 2020/0271749 A1 | 8/2020 | Wu et al. | |
| 2023/0018226 A1 | 1/2023 | Schmidt et al. | |
| 2023/0081472 A1* | 3/2023 | Wang .................... | H04W 4/029<br>340/539.12 |

FOREIGN PATENT DOCUMENTS

| | | | |
|---|---|---|---|
| CN | 111466085 | A | 7/2020 |
| EP | 3321712 | A1 | 5/2018 |
| JP | 2011-518326 | A | 6/2011 |
| JP | 2014-502339 | A | 1/2014 |
| JP | 2016-169977 | A | 9/2016 |
| JP | 2020-511654 | A | 4/2020 |
| JP | 2020-156667 | A | 10/2020 |
| WO | 2017/187337 | A1 | 11/2017 |

OTHER PUBLICATIONS

International Written Opinion from International Application No. PCT/US2021/072599, mailed Mar. 18, 2022, 8 pages.

Levitas, B. et al., UWB Time Domain Radar for Motion Detection, 2011 IEEE International Conference on Microwaves, Communications, Antennas and Electronic Systems, Nov. 7-9, 2011, IEEE, 7 pages DOI: 10.1109/COMCAS.2011.6105949.

Request for the Submission of an Opinion of Korean Patent Application No. 10-2023-7016656, mailed Feb. 17, 2025, 15 pages with English translation.

Yu, J. et al., A double-threshold target detection method in detecting low slow small target, ScienceDirect, Procedural Computer Science 174 (2020), 2019 International Conference on Identification, Information and Knowledge in the Internet of Things (IIKI2019), Elsevier B.V., pp. 616-624 DOI: 10.1016/j.procs.2020.06.133.

Notice of Reasons for Refusal of Japanese Patent Application No. 2023-530854, issued Oct. 7, 2025, 10 pages with English translation.

First Office Action and Search Report of Chinese Patent Application No. 202180078129.2, mailed Feb. 25, 2026, 24 page with English translation.

Notice of Final Rejection of Korean Patent Application No. 10-2023-7016656, mailed Jan. 27, 2026, 12 pages with English translation.

Decision to Grant of Japanese Patent Application No. 2023-530854, issued May 26, 2026, 6 pages with English translation.

Notice on Grant of Patent Right for Invention of Chinese Patent Application N o. 202180079129.2, issued Jul. 28, 2026, 11 pages with English translation.

* cited by examiner

RECEIVER PROCESSING CIRCUITRY FOR MOTION DETECTION AND RELATED SYSTEMS, METHODS, AND APPARATUSES

CROSS-REFERENCE TO RELATED APPLICATIONS

This application is a continuation-in-part of U.S. patent application Ser. No. 17/456,496, filed Nov. 24, 2021, and titled "RECEIVER PROCESSING CIRCUITRY FOR MOTION DETECTION AND RELATED SYSTEMS, METHODS, AND APPARATUSES," which claims the benefit under 35 U.S.C. § 119(e) of U.S. Provisional Patent Application No. 63/198,948, filed Nov. 24, 2020, and titled "SHORT RANGE RADAR USING CHANNEL IMPULSE RESPONSE INFORMATION AND RELATED SYSTEMS, METHODS, AND DEVICES," the entire disclosure of each of which is hereby incorporated herein by reference.

TECHNICAL FIELD

This disclosure relates generally to detection of moving objects responsive to an average of magnitudes of a sum of collections of reflected predetermined pattern samples and a predetermined threshold value.

BACKGROUND

Some radar systems may detect moving objects based on the Doppler Effect. Specifically, a continuous wave radio frequency (RF) signal may be transmitted, and the transmitted and received RF signals may be mixed to generate a Doppler signal. A Doppler frequency of the Doppler signal may be proportional to the speed of the detected moving object relative to a stationary transmitter and receiver, enabling the radar system to detect the velocity of the moving object in the direction of the radar system. In addition to continuous wave signals, pulse signals and frequency modulated signals may also be used to measure the distance between a radar antenna and a detected object.

Short range radar devices may include a transmitter and receiver, often implemented into a single device, which operate synchronously at, by way of non-limiting example, a frequency range of substantially twenty-four gigahertz (24 GHz) or seventy-seven gigahertz (77 GHz). These devices may use analog RF signals for the transmitter and receiver where the received and amplified signal is multiplied with the transmitted RF signal to generate the Doppler signal. As previously mentioned, the velocity of a moving object may be detected responsive to a frequency of the Doppler signal, which may require the combination of one transmitter and one receiver in one device and to operate the transmitter and the receiver synchronously. The use of a Doppler signal in this way to detect velocity may be limited to velocity detection in a direction of the short range radar device.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
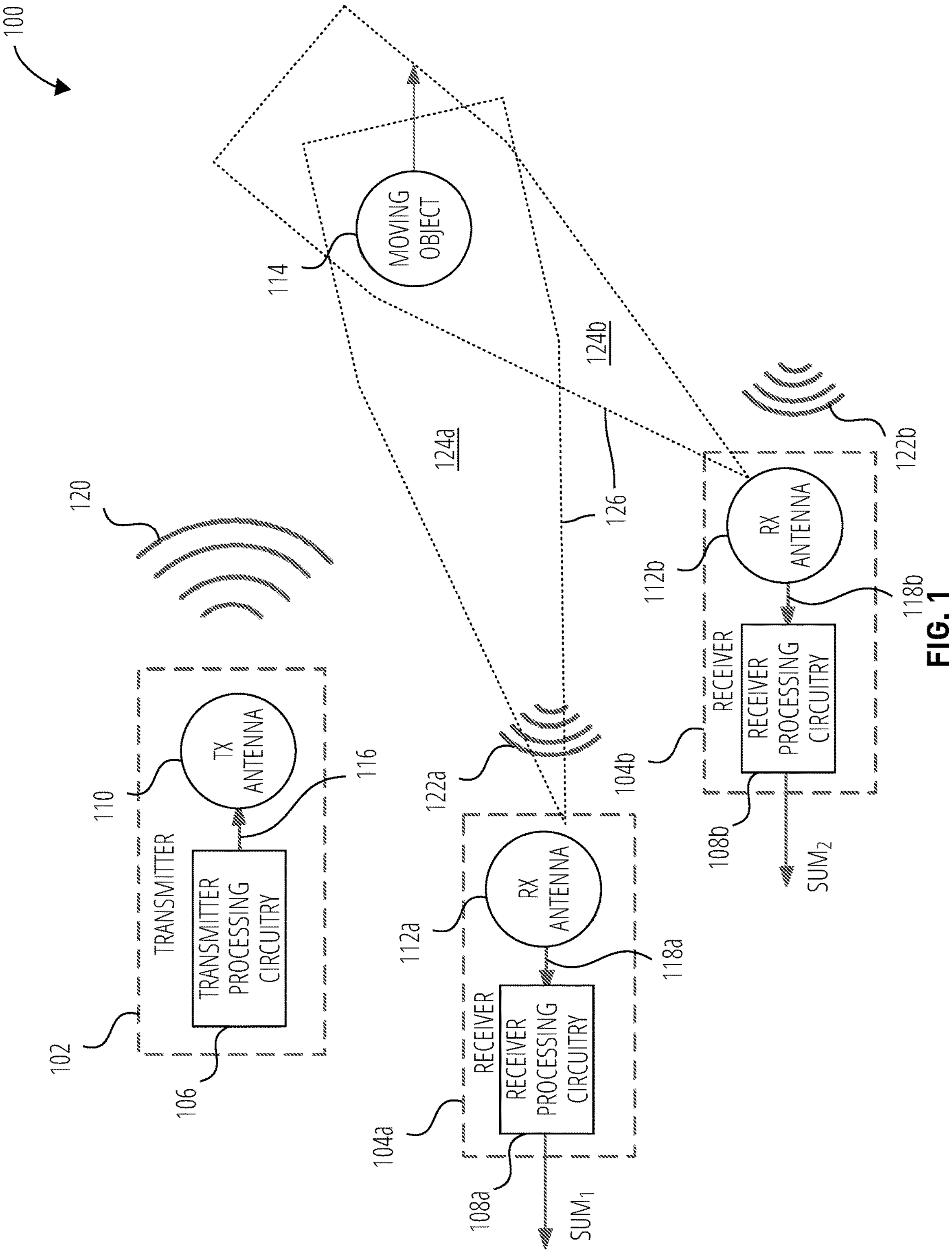
FIG. 1 is a block diagram of a radar system, according to some examples.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms “exemplary,” “by example,” and “for example,” means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as “first,” “second,” and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term “substantially” in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Ultra-wideband (UWB) is one example of a technology that may be used for short-range, high-bandwidth communications and radar applications. UWB radar devices, which utilize a bandwidth of >500 MHz, may be used to identify a position of an object using a receiver that is synchronized with a transmitter to determine time separations between pulses in a transmit signal and pulses in a receive signal. Due to its use of relatively short pulses, UWB may enable relatively precise distance and localization detection. UWB radar devices that detect positions of objects may be capable of detecting motion by monitoring changes in distance over time to detect velocity.

Examples disclosed herein may utilize a channel impulse response (CIR) to detect motion. As used herein, the term “CIR signal” refers to a sum of a plurality of collections of samples (sometimes referred to herein as “reflected predetermined pattern samples”) taken of a reflected predetermined pattern signal provided by a receiver antenna at a receiver responsive to a predetermined pattern signal driving a transmitter antenna of a transmitter. Each collection of the plurality of collections corresponds to a predetermined time window. The samples each represent a value of a received wave. Magnitudes of the CIR signal thus represent the total energy of the samples over the predetermined time window. The CIR signal may describe a behavior of a transmission channel between a transmitter and a receiver.

As a non-limiting example, a first collection of reflected predetermined pattern samples (e.g., 256 samples) may be taken over a predetermined time window (e.g., a 256 nanosecond, one sample per nanosecond, without limitation). A length of the predetermined time window may be selected to fit the predetermined pattern signal at the transmitter (e.g., the predetermined pattern signal may pulse every 256 nanoseconds). A second collection of the reflected predetermined pattern samples may then be taken and added to the first collection of reflected predetermined pattern samples. Subsequent collections of the reflected predetermined pattern signals may then be added to the total over a span of time (e.g., forty microseconds, corresponding to 156 predetermined time windows of 256 ns each) to produce a CIR signal, which may be a sum of the plurality of collections (e.g., 156 collections for a 256 nanosecond predetermined time window and a span of time of 40 microseconds). An average of magnitudes of values of the CIR signal may be taken to compare with a predetermined threshold value to determine whether a moving object is present (e.g., determine that a moving object is present responsive to the average of magnitudes of values of the CIR signal exceeding the predetermined threshold value).

Motion sensing capabilities disclosed herein may be added to a position detecting radar system (e.g., via software or firmware updates or upgrades) in addition to existing capabilities to provide motion sensing capabilities to a position sensing radar system (e.g., a radar system including one or more UWB radar devices, without limitation). For example, an existing radar device coupled to a rear of a vehicle that is originally to detect a distance between the rear of the vehicle to an object behind the vehicle may be updated with motion sensing capabilities disclosed herein to detect a gesture (e.g., a kicking motion) to trigger opening of a trunk of the vehicle. Also, UWB devices (e.g., 6-8 GHz UWB devices) for distance bounding for car access and short range radar application may be adapted for motion sensing according to examples disclosed herein. Examples disclosed herein may also be used to detect seat occupancy, to trigger passive entry systems in vehicles, to control devices and machines via gestures, and to perform other functions as will be apparent to those of ordinary skill in the art based on this disclosure.

Examples disclosed herein may not necessarily perform an analysis of a received RF signal itself and may not necessarily use synchronous operation between the transmitter and the receiver. The implementation may instead use a predetermined pattern signal (e.g., a predetermined pulse sequence of a data signal), which is accumulated over time to form a CIR signal of the transmission path between the transmitter and the receiver. Such a CIR signal may be processed by calculating an average of magnitudes of a sum of reflected predetermined pattern samples, which represents the distribution of the CIR signal over a predetermined time interval, which predetermined time interval may be a 256-nanosecond time interval (given by a pulse interval of a data telegram, as described further below).

To suppress noise in the captured CIR signal, gain control (GC) is set to a fixed level above the noise level and only reflected signal components that have the right data telegram pattern (e.g., alternating “0” and “1” symbols with a fixed distance of the predetermined time interval) are captured by the receivers. The receiver frontend (e.g., an analog-to-digital converter (ADC) of the frontend) may have a limited input range. A dynamic range of a signal provided to the receiver frontend should be adjusted to match the limited input range of the receiver frontend. The GC with a fixed gain level may be used to define a pulse energy detection window for a limited dynamic range of the receiver (e.g., the sensitivity of the radar system). If the gain setting is too low, no RF signal may be detected (e.g., the RF signal may be below a noise floor at the receiver frontend). If the gain is set too high, noise of the signal provided to the receiver may be amplified to the limited input range and the dynamic range of the signal provided to the receiver may be outside of the limited dynamic range of the receiver, and therefore may not be detected. Gain control may enable the use of multiple receivers to capture the CIR signals from different directions and to cover a certain area and range to detect moving objects. This setup may also be influenced by the antennas and the antenna patterns for the transmitter and the receivers. These antenna patterns may define the area and range that is covered to detect moving objects.

In one or more examples, a-priori knowledge of the structure of a transmitted data signal (e.g., fixed pattern of the preamble, without limitation) may be used by receiver devices (also referred to herein as “receivers”). Such a receiver may “lock” to this signal pattern (at the RF frequencies of the 0 and 1 symbols and on the time interval between these symbols) and may detect changes in the timing of the captured pattern. The respective gains at the receivers are adjusted to recognize only the reflected data signal and suppress noise.

Examples disclosed herein use digital patterns of the captured CIR signal and determine changes in the CIR signal between the background and a moving object. The devices may operate asynchronously instead of using a synchronized receiver(s) and transmitter. Examples disclosed herein may also function as described where the receivers and transmitters are synchronized. Where unsynchronized, however, multiple receivers may be used to determine an area that will be covered to detect moving objects. These multiple receivers may be located at different spatial positions without wired connections to the transmitter or to other receivers.

Examples disclosed herein enable the use of devices, such as UWB devices, without limitation, for additional applications beyond distance measurement, such as proximity detection, gesture recognition, and detection of moving objects. Examples disclosed herein may utilize build-in test modes and debug features of UWB devices, with or without any hardware modification of an existing UWB device. Examples of UWB devices that may be modified based on examples disclosed herein include ATA5350, ATA5352, ATA8350, and ATA8352 UWB devices available from Microchip Technology Inc., headquartered in Chandler, Arizona. Non-limiting examples of use cases for examples disclosed herein may include automotive applications (e.g., detection of a foot kick movement so as to open a trunk, passenger detection on car seats), home appliance applications (e.g., proximity detection for door opening), industrial automation control (e.g., one dimensional, two dimensional, and three dimensional gesture detection), home security applications, and any application that uses proximity detection or gesture recognition.

In contrast with short range radar devices that use analog RF signals at 24 GHz or 77 GHz to determine the Doppler frequency of a moving object, which may require the combination of one transmitter and one receiver in one device and to operate synchronously, some examples disclosed herein may use the CIR signal captured by the receiver at 7 GHz to detect moving objects. In some examples, the CIR signal may be captured by the receiver at 6-8 GHz, or other frequencies (e.g., at 24 GHz or 77 GHz). The receiver or receivers may operate asynchronously or synchronously to the transmitter. The use of several receivers allows the recognition of movement directions for gesture recognition or coverage of a predefined area.

Examples disclosed herein may not necessarily measure distance or speed of a moving object. Examples disclosed herein, however, may detect object movements in any direction within the detection range. The use of several receiver devices may enable detection of moving objects in an expanded area or to detect gestures and proximity.

A moving object may be distinguished from a stationary object because a peak in a CIR signal plotted over time for a moving object may be wider than a peak for a CIR signal plotted over time for a stationary object.

FIG. 1 is a block diagram of a radar system 100, according to some examples. The radar system 100 includes at least two UWB devices: a transmitter 102 and at least one receiver 104*a*, 104*b*. The transmitter 102 and the at least one receiver 104*a*, 104*b* may be used together to detect a moving object 114. In some examples, the transmitter 102 and one or more of the at least one receiver 104*a*, 104*b* may be implemented together in the same device. In some examples the transmitter 102 is implemented separately from the one or more receivers 104*a*, 104*b*. The transmitter 102 includes transmitter processing circuitry 106 and a transmit antenna 110. The transmitter processing circuitry 106 generates a predetermined pattern signal 116 (e.g., in preamble (PR) of a data telegram 200 of FIG. 2A), and provides the predetermined pattern signal 116 to the transmit antenna 110. The transmit antenna 110 may provide a transmitted predetermined pattern wave 120 continuously during a test mode of the transmitter 102 or as a portion of a data telegram (e.g., the data telegram 200 of FIG. 2A). By way of non-limiting example, in the test mode of the transmitter 102 the transmitted predetermined pattern wave 120 may repeatedly broadcast until an end of the test mode of the transmitter 102. In some examples, the transmitted predetermined pattern wave 120 may be continuously broadcasted in operational modes other than a test mode.

In the example of FIG. 1, one or more receivers 104*a*, 104*b* include a plurality of receivers 104*a*, 104*b* (i.e., two receivers). Although not shown, it will be appreciated that a number greater than two receivers may be used in some examples. Each of the plurality of receivers 104*a*, 104*b* has a respective individual detection area (receiver 104*a* has detection area 124*a* and receiver 104*b* has detection area 124*b*) associated therewith within which moving objects (e.g., the moving object 114) may be detected. In some examples, the detection area 124*a* and the detection area 124*b* may be the same detection area. In some examples, the detection area 124*a* and the detection area 124*b* may be different and substantially mutually exclusive. In some examples, the detection area 124*a* and the detection area 124*b* may be different but may overlap. The plurality of receivers 104*a*, 104*b* may be positioned relative to a total detection area 126 with the individual detection areas 124*a*, 124*b* associated with the plurality of receivers in sum substantially covering the total detection area 126.

The receivers 104*a*, 104*b* may each include respective receiver processing circuitry (e.g., the receiver 104*a* includes receiver processing circuitry 108*a* and the receiver 104*b* includes the receiver processing circuitry 108*b*) and a receiver antenna (e.g., the receiver 104*a* includes a receiver antenna 112*a* and the receiver 104*b* includes a receiver antenna 112*b*).

Responsive to transmission, by the transmitter 102, of the transmitted predetermined pattern wave 120, the receiver antennae 112*a*, 112*b* may receive respective reflected predetermined pattern waves 122*a*, 122*b*, and provide respective reflected predetermined pattern signals 118*a*, 118*b* to the respective receiver processing circuitry 108*a*, 108*b*. The receiver processing circuitry 108*a*, 108*b* may respectively accumulate collections of samples of the respective reflected predetermined pattern signals 118*a*, 118*b* while in a receive mode. Specifically, the receiver processing circuitry 108*a*, 108*b* may respectively sample the reflected predetermined pattern signals 118*a*, 118*b* (e.g., for a time span of substantially forty microseconds), determine a sum ($SUM_1$ from the receiver processing circuitry 108*a* and $SUM_2$ from the receiver processing circuitry 108*b*) of collections (e.g., substantially 156 collections) of the samples of the reflected predetermined pattern signals 118*a*, 118*b*, each collection of samples taken over a predetermined time window (e.g., substantially 256 nanoseconds, without limitation), and determine whether a moving object is sensed responsive to an average of magnitudes of sums ($SUM_1$ and $SUM_2$) of the collections of samples of the reflected predetermined pattern signals 118*a*, 118*b* and a predetermined threshold value. The samples of the reflected predetermined pattern signals 118*a*, 118*b* each represent values of a received wave, and thus magnitudes (absolute values) of the sum of collections of the samples of the reflected predetermined pattern signals 118*a*, 118*b* over the predetermined time window represents the total energy of the samples over the predetermined time window.

Due to the asynchronous operation of the transmitter 102 and the at least one receiver 104*a*, 104*b* and the movement of a reflecting object (e.g., a human), magnitudes of the CIR signal exhibit different distributions for a static object than for a moving object. In case of a static object only small portions of the CIR signal magnitudes exhibit a signal level that is greater than substantially zero. In case of a moving object, larger portions of the CIR signal magnitudes exhibit a signal level that is greater than substantially zero as compared to those of the case of the static object and the case of no object. The CIR signal magnitudes may be averaged to generate an average, which is an average of the magnitudes of values of a CIR signal (e.g., an average of magnitudes of a sum of a plurality of collections of the reflected predetermined pattern signals). By thus generating an average, a moving object may be detected by comparing the average to a predetermined threshold value.

A first sum signal $SUM_1$ (a first CIR signal), which is a sum of the collection of samples of the reflected predetermined pattern signal 118*a* over a predetermined time window, may be related to the movement of the moving object 114 within detection area 124*a* of the receiver 104*a*. This first sum signal $SUM_1$ may be generated by receiver 104*a*, which may operate independently from the transmitter 102 and the other receivers (e.g., receiver 104*b*) in an asynchronous way. A second sum signal $SUM_2$ (a second CIR signal), which is a sum of the collection of samples of the reflected predetermined pattern signal 118*b* over a predetermined time window, may be related to the movement of the moving object 114 within detection area 124*b* of the receiver 104*b*. This second sum signal $SUM_2$ may be generated by receiver

104*b*, which may operate independently from the transmitter 102 and the other receivers (e.g., receiver 104*a*) in an asynchronous way.

The position, antenna pattern, and orientation of the transmit antenna 110 and the receiver antennae 112*a*, 112*b* may determine the active area and the range where movement of the moving object 114 is detected.

The first and second CIR signal (e.g., $SUM_1$ or $SUM_2$ over time, respectively) may be captured during a preamble PR of a data telegram 200 (see FIG. 2A below). In some examples, the transmitter 102 may transmit the preamble continuously rather than transmit the preamble within the data telegram 200. The receivers 104*a*, 104*b* may be in a search mode locking on to the preamble signal PR and collecting data, i.e., reflected predetermined pattern samples, for the CIR signal. The receivers 104*a*, 104*b* may generate a respective CIR signal, i.e., a sum of collections of sample values of the reflected predetermined pattern signals 118*a*, 118*b* over a time span, i.e., each collection taken over a predetermined time window, and may compare an average of the sum with a predetermined threshold value may enable detection of movement (e.g., by the moving object 114).

Figure 2A:
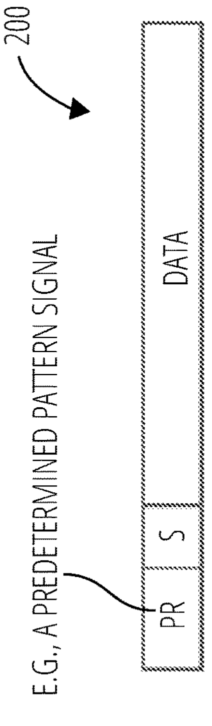
FIG. 2A is a data telegram that may be transmitted by a transmitter of FIG. 1, according to some examples.

FIG. 2A is a data telegram 200 that may be transmitted by the transmitter 102 of FIG. 1, according to some examples. The data telegram 200 may include the predetermined pattern signal 116 of FIG. 1. For example, the data telegram 200 includes a preamble PR, a sync word S, and a data payload DATA. The preamble PR may include a predetermined pattern signal (e.g., the predetermined pattern signal 116 of FIG. 1) such as a pulse train (e.g., 10101010, without limitation), which corresponds to a known predetermined pattern (e.g., known at the receivers 104*a*, 104*b*). Accordingly, when a transmitter processing circuitry (e.g., the transmitter processing circuitry 106 of FIG. 1) generates the data telegram 200, the transmitter processing circuitry 106 generates a predetermined pattern signal to provide a reflected predetermined pattern signal (e.g., the reflected predetermined pattern signals 118*a*, 118*b* of FIG. 1 due to the preamble PR) responsive to reflection of the transmitted predetermined pattern wave 120 (FIG. 1) by one or more objects (e.g., the moving object 114, as illustrated in FIG. 1). The sync word S may include a fixed pattern of one hundred twenty-seven symbols. The data payload DATA may include "0" and "1" bits coded in symbols. The sync word S and data payload DATA need not be analyzed for motion detection purposes, but may be used for other purposes such as data communication. As previously discussed, at the receivers 104*a*, 104*b* a span of time of substantially forty microseconds (40 μs), which may include 156 predetermined time windows of 256 nanoseconds, may be used to generate a CIR signal such as $SUM_1$ or $SUM_2$, which may then respectively be utilized to generate an average $SUM_1$ and an average $SUM_2$ (e.g., an average of a sum of a plurality of collections of the reflected predetermined pattern samples).

Figure 2B:
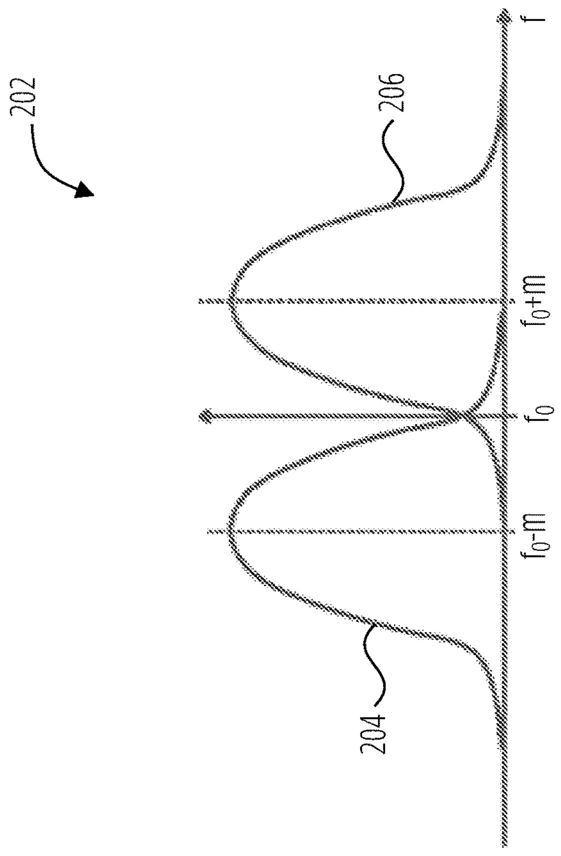
FIG. 2B is a plot illustrating a "1" symbol frequency content and a "0" symbol frequency content of a preamble of the data telegram of FIG. 2A, according to some examples.

The data telegram 200 may be a binary frequency-shift keying (BFSK) signal. Accordingly, in some examples, where the preamble signal PR indicates a "1," the preamble signal PR (and the predetermined pattern signal 116 of FIG. 1) may oscillate at a first frequency $f_0-m$ (where "$f_0$" is a center frequency and "m" is a constant value). Also, where the preamble signal PR (and the predetermined pattern signal 116 of FIG. 1) indicates a "0," the preamble signal PR may oscillate at a second frequency $f_0+m$, as illustrated in FIG. 2B. By way of non-limiting example, the center frequency $f_0$ may be substantially 6.5 GHz and m may be substantially 145 megahertz (MHz).

FIG. 2B is a BFSK signal frequency plot 202 illustrating a "1" symbol frequency content 204 and a "0" symbol frequency content 206 of the preamble PR of the data telegram 200 of FIG. 2A, according to some examples. Other portions (e.g., the sync word S and the data payload DATA) of the data telegram 200 may also be transmitted using BFSK (e.g., the entire data telegram 200 may be transmitted using BFSK). As illustrated in FIG. 2B, the "1" symbol frequency content 204 is centered about first frequency $f_0-m$ and the "0" symbol frequency content 206 is centered about the second frequency $f_0+m$.

Figure 2C:
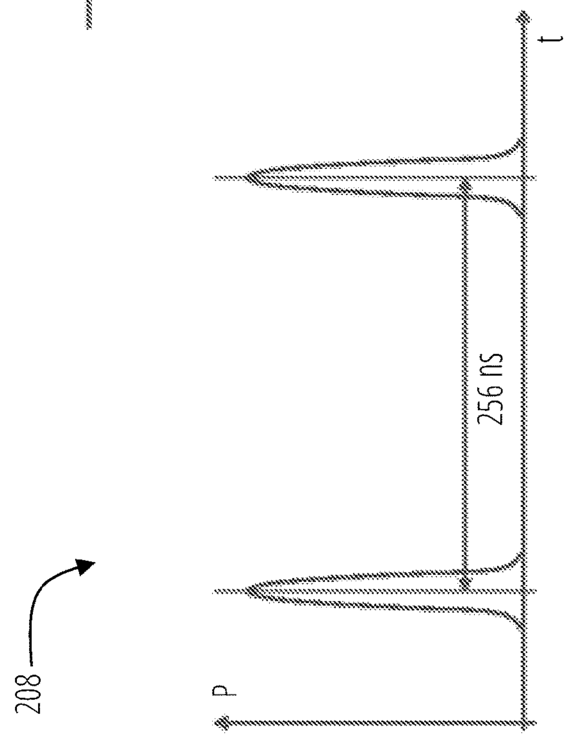
FIG. 2C is a plot of an example of a pulse train of the preamble signal PR of FIG. 2A.

FIG. 2C is a plot 208 of an example of a pulse train of the preamble signal PR of FIG. 2A. The pulse train includes pulses that are a predetermined time interval apart. In one example, the predetermined time interval is 256 nanoseconds (ns), with the predetermined time interval defined between subsequent signal peaks. In some examples, a value of a predetermined time window for each collection of samples used for determining a sum of collections (e.g., $SUM_1$, $SUM_2$ of FIG. 1, without limitation) may be equal to the predetermined time interval (256 ns in the example of FIG. 2C).

Figure 3:
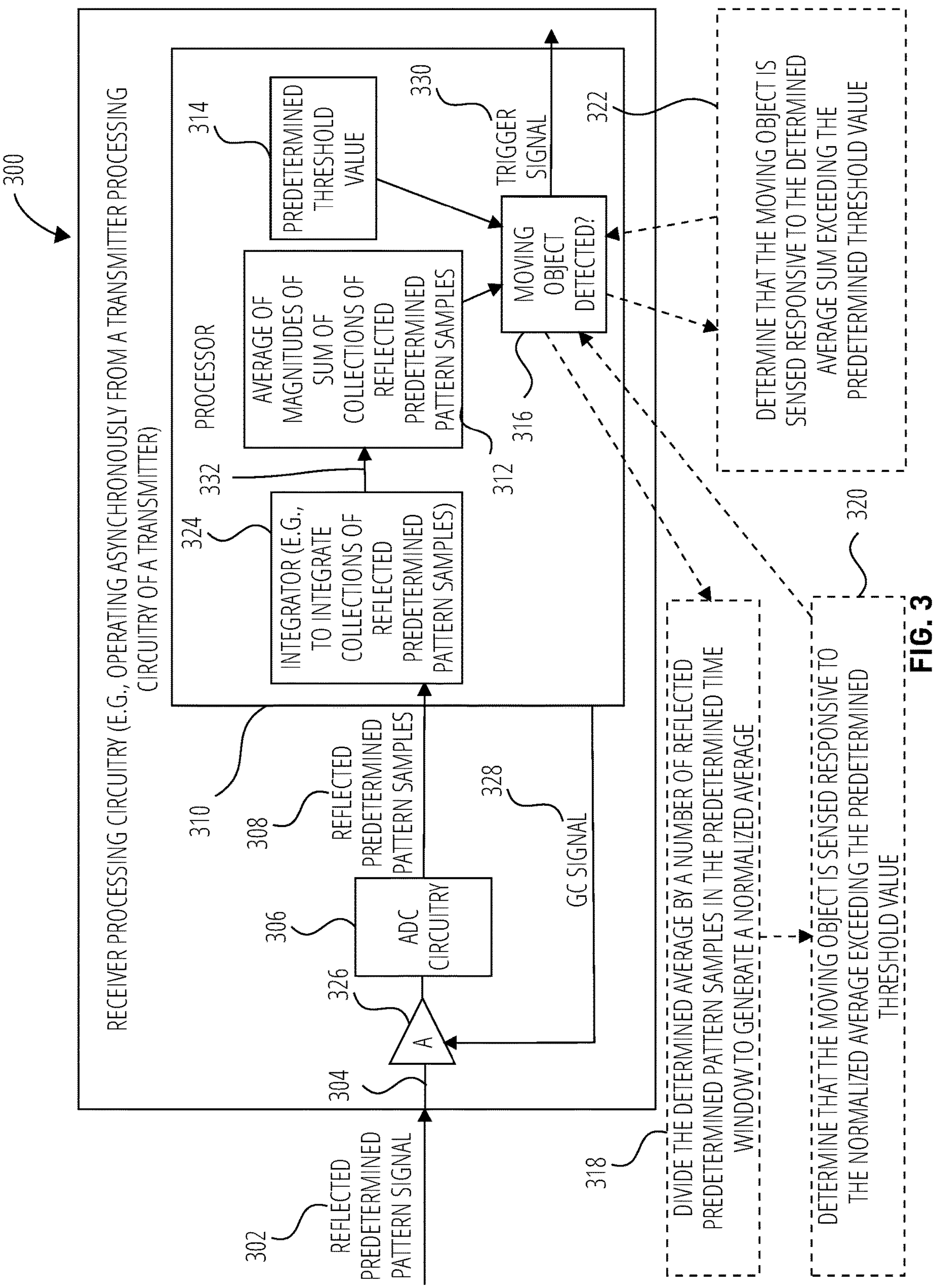
FIG. 3 is a block diagram of a receiver processing circuitry, according to some examples.

FIG. 3 is a block diagram of a receiver processing circuitry 300, according to some examples. The receiver processing circuitry 300 is an example of the respective receiver processing circuitries 108*a*, 108*b* of FIG. 1. In some examples the receiver processing circuitry 300 may operate asynchronously from a transmitter processing circuitry (e.g., the transmitter processing circuitry 106 of FIG. 1) of a transmitter (e.g., the transmitter 102 of FIG. 1). For example, at least one of the receivers 104*a*, 104*b* of FIG. 1 may operate asynchronously from the transmitter processing circuitry 106 of FIG. 1.

The receiver processing circuitry 300 includes an analog input terminal 304 to receive a reflected predetermined pattern signal 302 (e.g., one of the reflected predetermined pattern signals 118*a*, 118*b* of FIG. 1) received via a receiver antenna (e.g., a respective one of the receiver antennae 112*a*, 112*b* of FIG. 1). The receiver processing circuitry 300 includes an adjustable gain amplifier 326 electrically connected to the analog input terminal 304. The adjustable gain amplifier 326 may have an adjustable gain A that is adjustable responsive to a GC signal 328. The adjustable gain amplifier 326 amplifies the received reflected predetermined pattern signal 302 by the adjustable gain A. Adjusting the adjustable gain A of the adjustable gain amplifier 326 may enable the sensitivity of the receiver processing circuitry 300 to be adjusted.

The receiver processing circuitry 300 also includes an analog-to-digital converter (ADC) circuitry 306 to sample the amplified reflected predetermined pattern signal 302 received by the analog input terminal 304 and amplified by the adjustable gain amplifier 326 to generate reflected predetermined pattern samples 308. By way of non-limiting example, the adjustable gain amplifier 326 may amplify the reflected predetermined pattern signal 302 into an operational input range of the ADC circuitry 306, which may be a dynamic range of a receiver including the receiver processing circuitry 300.

The receiver processing circuitry 300 includes a processor 310 (e.g., one or more processing cores). The processor 310 may provide the GC signal 328 to the adjustable gain amplifier 326 to adjust the adjustable gain A of the adjustable gain amplifier 326. Stated another way, the processor 310 adjusts the gain of the receiver processing circuitry 300.

The processor 310 implements an integrator 324 (e.g., implemented in hardware and/or in software) that integrates, for a time span (e.g., 40 μs), the collections of reflected predetermined pattern samples 308, each of the collections taken over a predetermined time window (e.g., 256 ns). The integrator 324 may accumulate the collections of reflected predetermined pattern samples 308 over a time span (e.g., 40 μs) to provide a sum 332 of the collections of reflected predetermined pattern samples 308. The processor 310 may then use the sum 332 to determine an average 312 of magnitudes of the sum 332 (e.g., an average of magnitudes of one of $SUM_1$ or $SUM_2$ of FIG. 1) of the reflected predetermined pattern samples 308. Accordingly, the average 312 may include an average of magnitudes of the sum 332 of a plurality of collections of the reflected predetermined pattern samples 308. The processor 310 may determine whether a moving object is sensed (moving object detection 316) responsive to the determined average 312 and a predetermined threshold value 314.

In some examples, moving object detection 316 (determining whether a moving object is sensed) includes operation 318 and operation 320. In such examples, at operation 318, the processor 310 divides the average 312 by a number of the reflected predetermined pattern samples in the predetermined time window to generate a normalized average sum. At operation 320, the processor 310 determines that the moving object is sensed responsive to the normalized average sum exceeding the predetermined threshold value 314.

In some examples, moving object detection 316 (determining whether a moving object is sensed) includes operation 322. In such examples, at operation 322, the processor 310 determines that the moving object is sensed responsive to the determined average 312 exceeding the predetermined threshold value 314. In some examples, determining whether a moving object is sensed may include determining a direction of movement of a moving object responsive to magnitudes of the sum 332 and magnitudes of another sum (not shown) from another receiver (not shown). By way of non-limiting example, a shift in time of magnitudes of a sum from one receiver as compared to magnitudes of a sum of another receiver may be analyzed to determine a direction of motion of a moving object.

In some examples, the processor 310 may output a trigger signal 330 responsive to a determination, at operation 316, that the moving object is detected. A receiver (e.g., the receivers 104*a*, 104*b* of FIG. 1, respective) including the receiver processing circuitry 300 may output this trigger signal 330 responsive to the determination that the moving object is detected to trigger other operations. By way of non-limiting examples, at least one of a vehicle trunk opening mechanism, a door opening mechanism, and an industrial automation controller may trigger responsive to the trigger signal 330.

Figure 4:
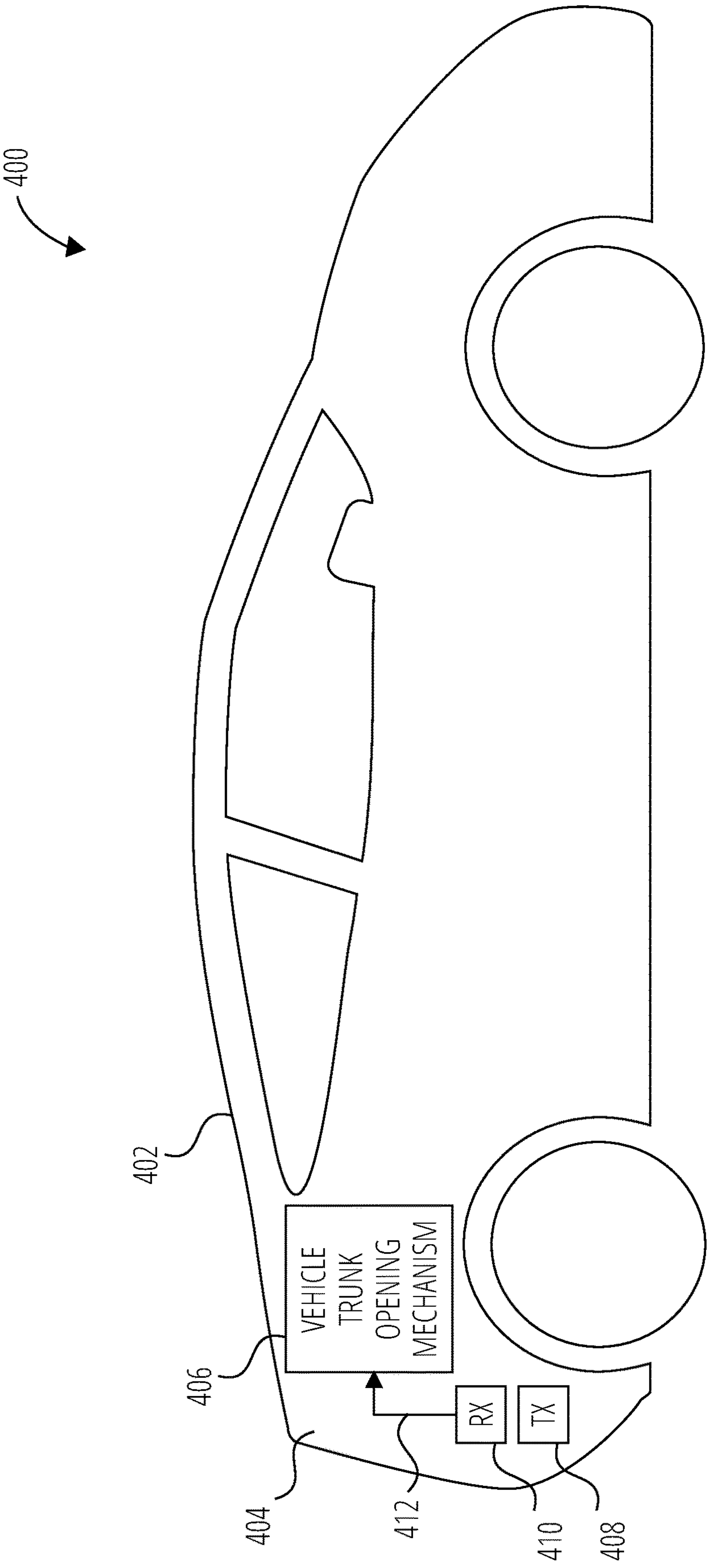
FIG. 4 is a side view of a motion detection system, according to some examples.

FIG. 4 is a side view of a motion detection system 400, according to some examples. The motion detection system 400 includes a vehicle 402 including a transmitter 408 similar to the transmitter 102 of FIG. 1 and one or more receivers 410 similar to the receivers 104*a*, 104*b* of FIG. 1. Although not shown, the one or more receivers 410 each include a receiver processing circuitry similar to the receiver processing circuitry 300 of FIG. 3. Accordingly, the one or more receivers 410 may output a trigger signal 412 similar to the trigger signal 330 of FIG. 3 responsive to a determination that a moving object is detected within a total detection area (e.g., the total detection area 126 of FIG. 1) of the one or more receivers 410.

The vehicle 402 also includes a trunk 404 and a vehicle trunk opening mechanism 406, such as an electronically controllable latch, that opens the trunk 404 responsive to the trigger signal 412. Accordingly, responsive to a determination that a moving object is detected within the total detection area of the one or more receivers 410, the one or more receivers 410 may provide the trigger signal 412 to the vehicle trunk opening mechanism 406, triggering the vehicle trunk opening mechanism 406 to open the trunk 404. By way of non-limiting example, the motion detection system 400 may trigger the opening of the trunk 404 responsive to a detection of a kick motion of a person within the total detection area, where the kick motion is detected as a moving object of a leg. As a result, a person that is carrying a load of items to be placed in the trunk or that otherwise does not have free hands to manually open the trunk 404 may open the trunk 404 using a motion gesture.

Figure 5:
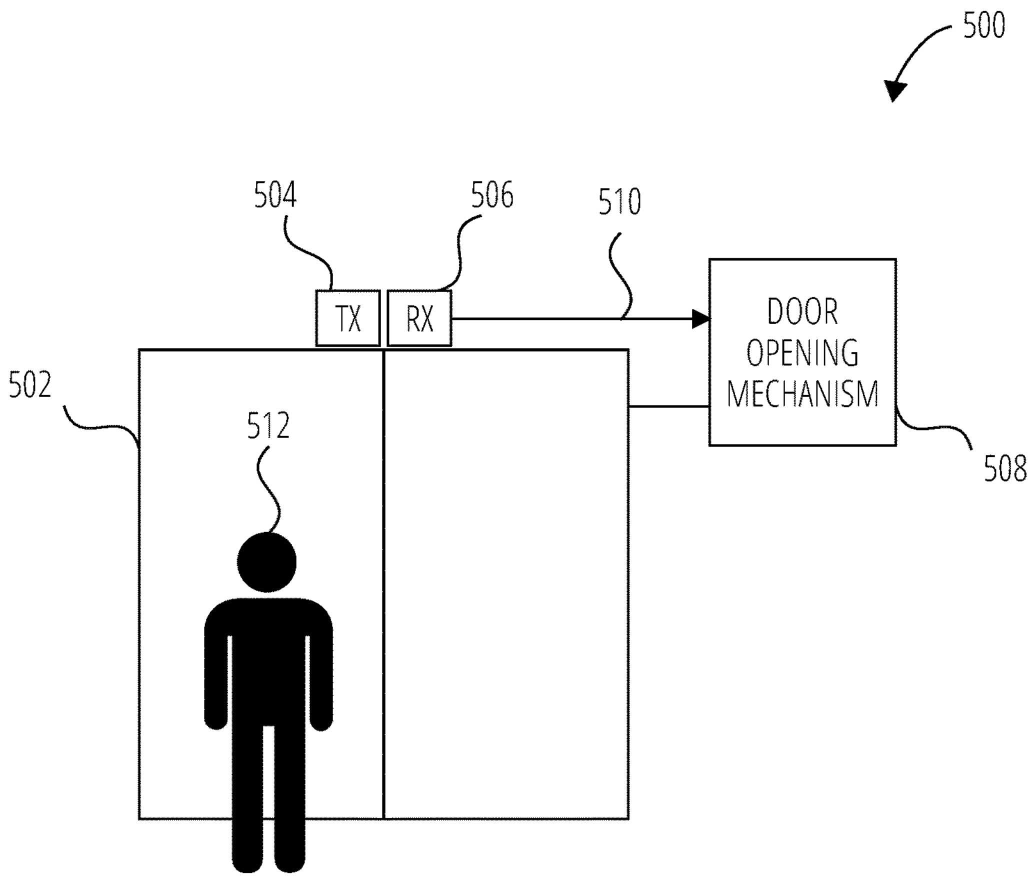
FIG. 5 is another motion detection system, according to some examples.

FIG. 5 is another motion detection system 500, according to some examples. The motion detection system 500 includes an automatic door 502, a door opening mechanism 508 that opens the automatic door 502, such as an electronically controllable swinging or sliding door, a transmitter 504 similar to the transmitter 102 of FIG. 1 and one or more receivers 506 similar to the receivers 104*a*, 104*b* of FIG. 1. Although not shown, the one or more receivers 506 each include a receiver processing circuitry similar to the receiver processing circuitry 300 of FIG. 3. Accordingly, the one or more receivers 506 may output a trigger signal 510 similar to the trigger signal 330 of FIG. 3 responsive to a determination that a moving object is detected within a total detection area (e.g., the total detection area 126 of FIG. 1) of the one or more receivers 506.

The trigger signal 510 may trigger the door opening mechanism 508 to open the automatic door 502. Accordingly, responsive to the one or more receivers 506 detecting motion such as a moving person 512 within a total detection area (e.g., the total detection area 126 of FIG. 1) of the one or more receivers 506, the one or more receivers 506 may provide the trigger signal 510 to the door opening mechanism 508, which may open the automatic door 502 responsive to the trigger signal 510.

Figure 6:
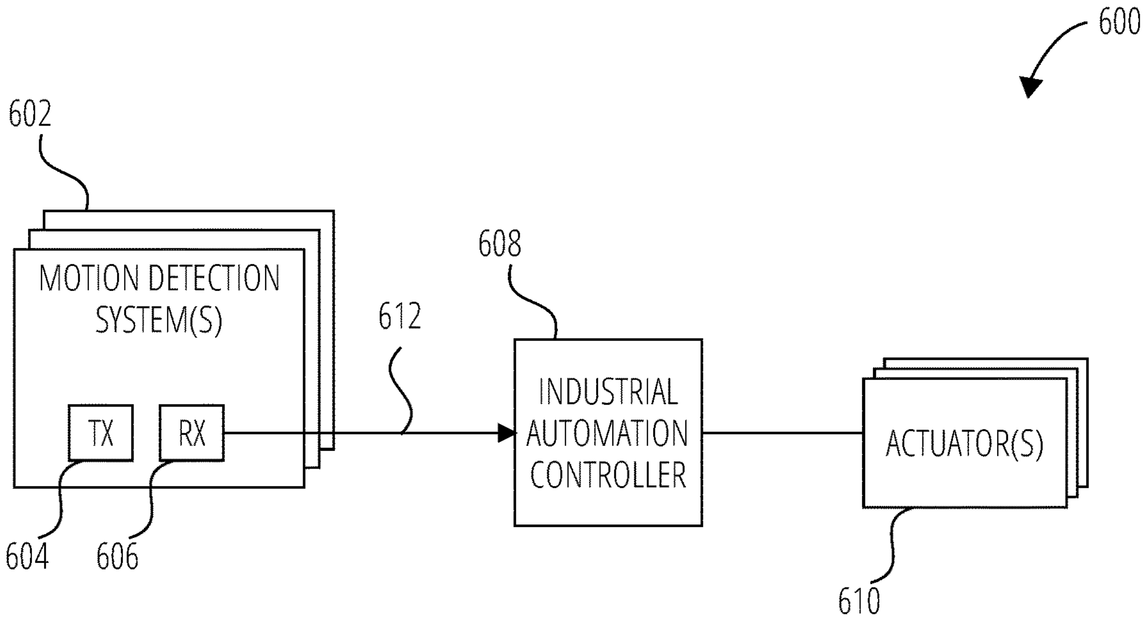
FIG. 6 is a block diagram of an industrial automation system, according to some examples.

FIG. 6 is a block diagram of an industrial automation system 600, according to some examples. The industrial automation system 600 includes one or more motion detection systems 602, an industrial automation controller 608, and one or more actuators 610 operably coupled to the industrial automation controller 608. The industrial automation controller 608 may control various actuators 610 of the industrial automation system 600 to perform various industrial automation tasks.

Each of the one or more motion detection systems 602 may include a transmitter 604 similar to the transmitter 102 of FIG. 1 and one or more receivers 606 similar to the receivers 104*a*, 104*b* of FIG. 1. Although not shown, the one or more receivers 606 each include a receiver processing circuitry similar to the receiver processing circuitry 300 of FIG. 3. Accordingly, the one or more receivers 606 may each output a trigger signal 612 similar to the trigger signal 330 of FIG. 3 responsive to a determination that a moving object is detected within a total detection area (e.g., the total detection area 126 of FIG. 1) of the one or more receivers 606.

The trigger signal 612 may trigger the industrial automation controller 608 to control the actuators 610 to perform or stop performing any of a variety of different functions. By way of non-limiting example, if one of the one or more motion detection systems 602 provides a trigger signal 612 to the industrial automation controller 608 corresponding to a detected motion near moving parts of the industrial automation system 600, the industrial automation controller 608 may stop those moving parts from moving. In such an example, a moving person or moving limb (e.g., arm, leg, hand) of a person may not be damaged or crushed by the moving parts because the detected movement of the person triggered the industrial automation controller 608 to stop moving the moving parts.

Figure 7A:
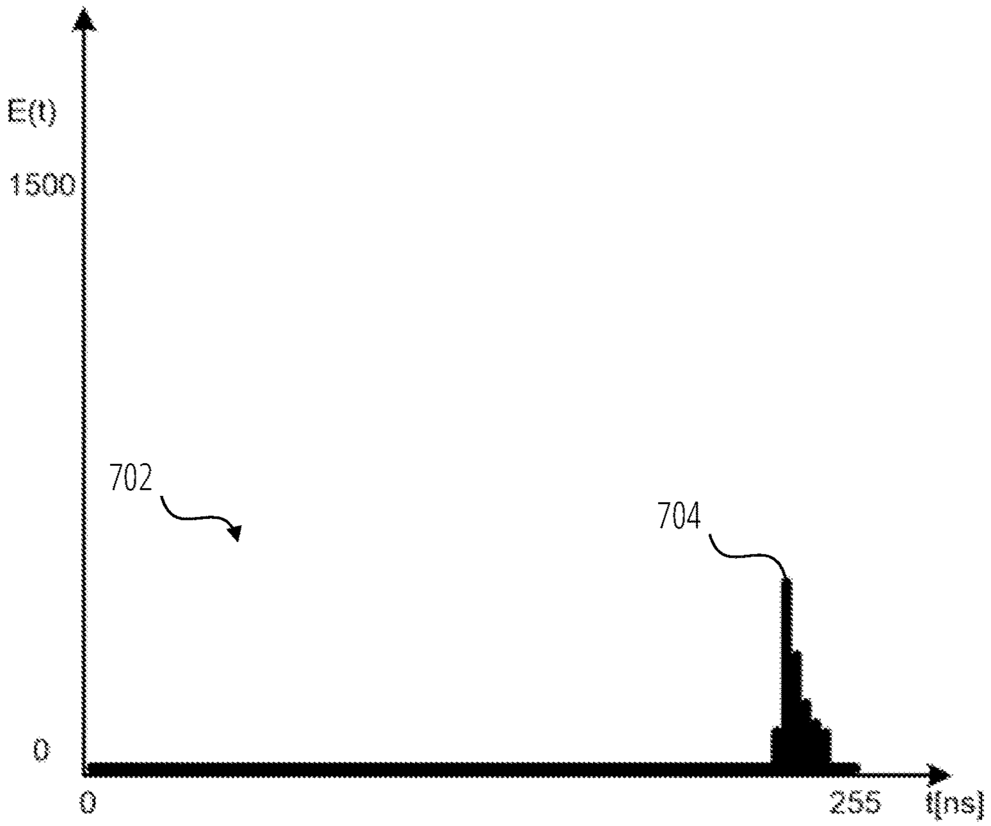
FIG. 7A and FIG. 7B illustrate CIR signal magnitudes for background signals that may result without an object or with a static object (no moving object) within a receive range of the receivers.
Figure 7B:
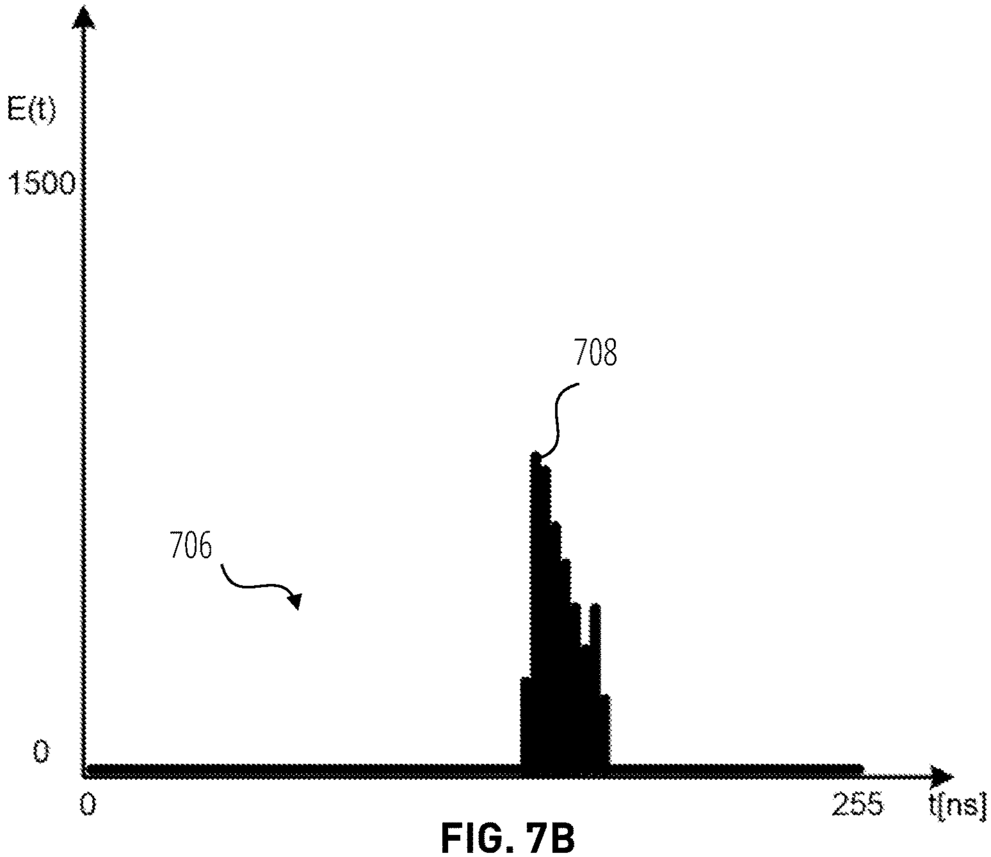

FIG. 7A and FIG. 7B illustrate CIR signal magnitudes (absolute values of CIR signal values) that may result from background signals without an object or with a static object (no moving object) within a receive range of the receivers 104*a*, 104*b* (FIG. 1). The CIR signal magnitudes illustrated in FIG. 7A and FIG. 7B represent signal energies of collections of reflected predetermined pattern samples accumulated over a time span of 40 μs for a sampling interval (a predetermined time window of 256 ns) of each of the collections at a sample rate of 1 ns. As a result, indices of the reflected predetermined samples in each collection range from [0 . . . 255]. The 40 μs time span includes 156 collections of reflected predetermined pattern samples where the collections are contiguous. Accordingly, the CIR signals magnitudes of FIG. 7A and FIG. 7B include 256 values, each of which is a magnitude of a value of a sum of like-indexed values from each of the collections of reflected predetermined pattern samples. For example, a CIR signal magnitude value indexed as [0] is the magnitude of the sum of the reflected predetermined pattern samples indexed as [0] in the collections. Also, a CIR signal magnitude value indexed as [n] is the magnitude of the sum of the reflected predetermined pattern samples indexed as [n] in the collections.

FIG. 7A illustrates a CIR signal magnitude 702, which may be a magnitude E(t) (vertical axis) of a sum (e.g., the $SUM_1$ of FIG. 1, the $SUM_2$ of FIG. 1) of collections of reflected predetermined pattern samples plotted against time (horizontal axis) where no object is present. Since each collection of reflected predetermined samples includes 256 samples, the CIR signal magnitude 702, which is a sum of the collections, also includes 256 samples. The CIR signal magnitude 702 includes a peak 704, as illustrated in FIG. 7A. The CIR signal magnitude 702 is relatively small other than at the peak 704, and a magnitude of the peak 704 and a width of the peak 704 are relatively small because the CIR signal magnitude 702 represents substantially only background reflection due to a lack of an object.

FIG. 7B illustrates another example of a CIR signal magnitude 706, which may be a magnitude E(t) (vertical axis) of a sum (e.g., the $SUM_1$ of FIG. 1, the $SUM_2$ of FIG. 1) of collections of reflected predetermined pattern samples plotted against time (horizontal axis) with a static object present. The CIR signal magnitude 706 includes a peak 708, as illustrated in FIG. 7B. Similar to the CIR signal magnitude 702 of FIG. 7A, the CIR signal magnitude 706 is relatively small other than at the peak 708. The peak 708 is a little higher magnitude and is a little wider than the peak 704 for the no object present case, but the magnitude and width of the peak 708 are still relatively low because the object is stationary.

Figure 8A:
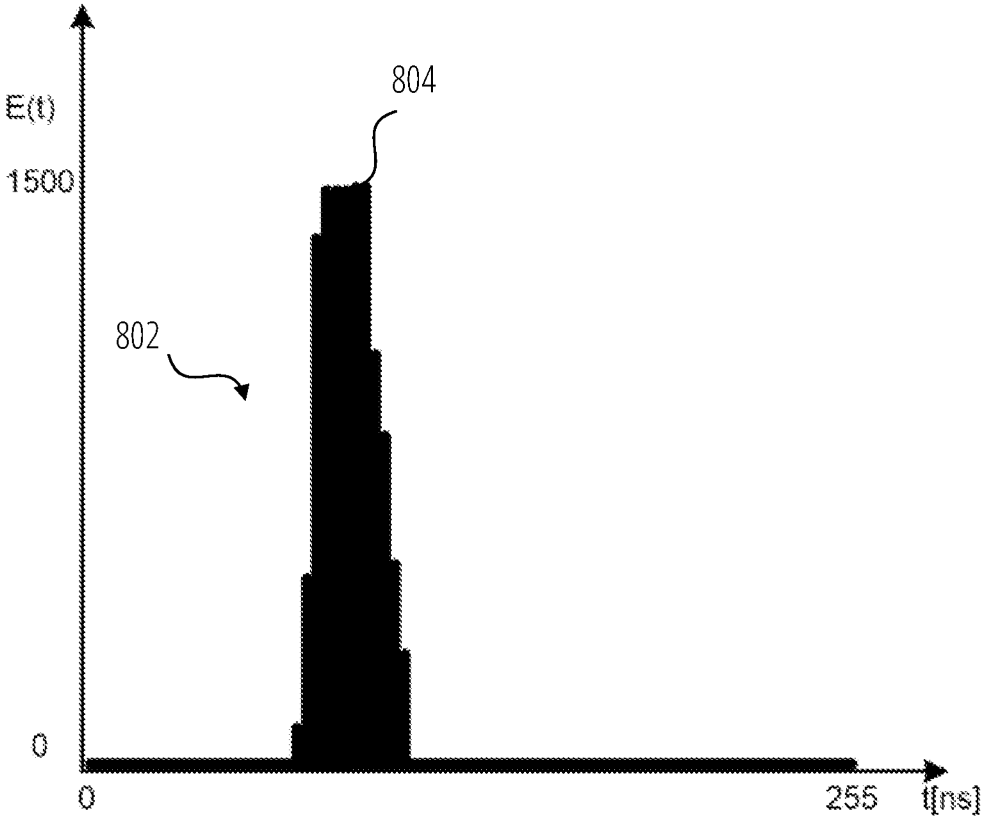
FIG. 8A and FIG. 8B illustrate CIR signal magnitudes that may result with a moving object within a receive range of the receivers.
Figure 8B:
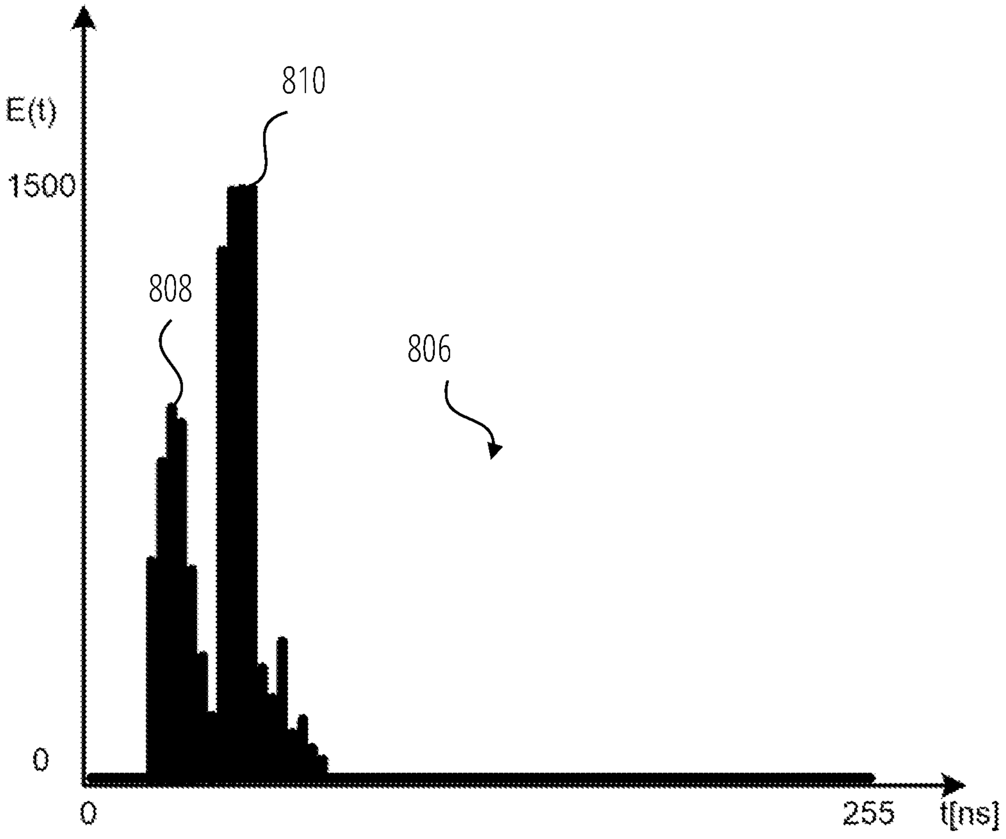

FIG. 8A and FIG. 8B illustrate CIR signal magnitudes (absolute values of CIR signal values) that may result with a moving object within a receive range of the receivers 104*a*, 104*b* (FIG. 1). Similar to the CIR signal magnitudes illustrated in FIG. 7A and FIG. 7B, the CIR signal magnitudes illustrated in FIG. 8A and FIG. 8B represent collections of reflected predetermined pattern samples accumulated over a time span of 40 μs for a sampling interval (a predetermined time window of 256 ns) of each of the collections at a sample rate of 1 ns. As a result, indices of the reflected predetermined samples in each collection range from [0 . . . 255]. The 40 μs time span includes 156 collections of reflected predetermined pattern samples where the collections are contiguous. Accordingly, the CIR signal magnitudes of FIG. 8A and FIG. 8B include 256 values, each of which is a magnitude of a sum of the like-indexed values from each of the collections of reflected predetermined pattern samples.

FIG. 8A illustrates a CIR signal magnitude 802, which may be a magnitude (vertical axis) of a sum (e.g., the $SUM_1$ of FIG. 1, the $SUM_2$ of FIG. 1) of collections of reflected predetermined pattern samples plotted against time (horizontal axis) with a moving object present. The CIR signal magnitude 802 includes a peak 804, as illustrated in FIG. 8A. A magnitude and width of the peak 804 are larger than those of the peaks 704, 708 of FIG. 7A and FIG. 7B. In fact, the CIR signal magnitude 802 has saturated at a magnitude of substantially 1500 at the peak 804. Saturation of a CIR signal magnitude such as the CIR signal magnitude 802 may be characteristic of a moving object being present because of the overall accumulated pulse energies from reflected pulses due to changes in reflection.

FIG. 8B illustrates another example of a CIR signal magnitude 806, which may be a magnitude (vertical axis) of a sum (e.g., the $SUM_1$ of FIG. 1, the $SUM_2$ of FIG. 1) of collections of reflected predetermined pattern samples plotted against time (horizontal axis) with a moving object present. The CIR signal magnitude 806 includes peaks 808 and 810, as illustrated in FIG. 8B. Similar to the peak 804 of FIG. 8A, the magnitude and width of peak 810 are larger than those of the peaks 704, 708 of FIG. 7A and FIG. 7B. Also, the CIR signal magnitude 806 is saturated at method 1500 at the peak 810. Accordingly, as illustrated in FIG. 7A through FIG. 8B, higher and wider peaks in a CIR signal magnitude may be expected where a moving object is in the detection region as compared to those for a "stationary object" scenario or for a "no object" scenario.

Typically, a CIR exhibits more than just a single peak because the received signal is an overlay of reflected signals coming from different distances relative to the first received, leading-edge reflected signal, and possibly each other. The other reflected signals have a longer path than the leading-edge signal and have a delay relative to the leading-edge reflected signal. The amount of energy of a reflected signal (e.g., signals reflected from moving objects or the background, without limitation) is at least partially based on the distance between the receiver and the source of the reflection. Signals reflected by an object moving between background and receiver have greater energy than signals reflected by a background, typically due to shorter distance between object and receiver than background and receiver. The signal-to-noise-ratio (SNR) of a reflected signal is inversely related to the distance between the reflection source and the receiver. Signals reflected from moving objects exhibit a greater width of peak than signals reflected from stationary objects.

An average CIR signal (e.g., the average 312 of FIG. 3) is higher if a moving object is present than an average CIR signal where no moving object is present, and a predetermined threshold value (e.g., the predetermined threshold value 314 of FIG. 3) may be selected to be higher than expected for an average CIR signal without moving objects, but lower than expected for an average sum of a CIR signal with a moving object. As explained above, the average CIR signal is higher because when an object moves between the background and receiver more energy is reflected due to the shorter distance from the object to the receiver, and the CIR signal now has a larger width than before, due to the movement and also a higher signal to noise ratio.

Figure 9A:
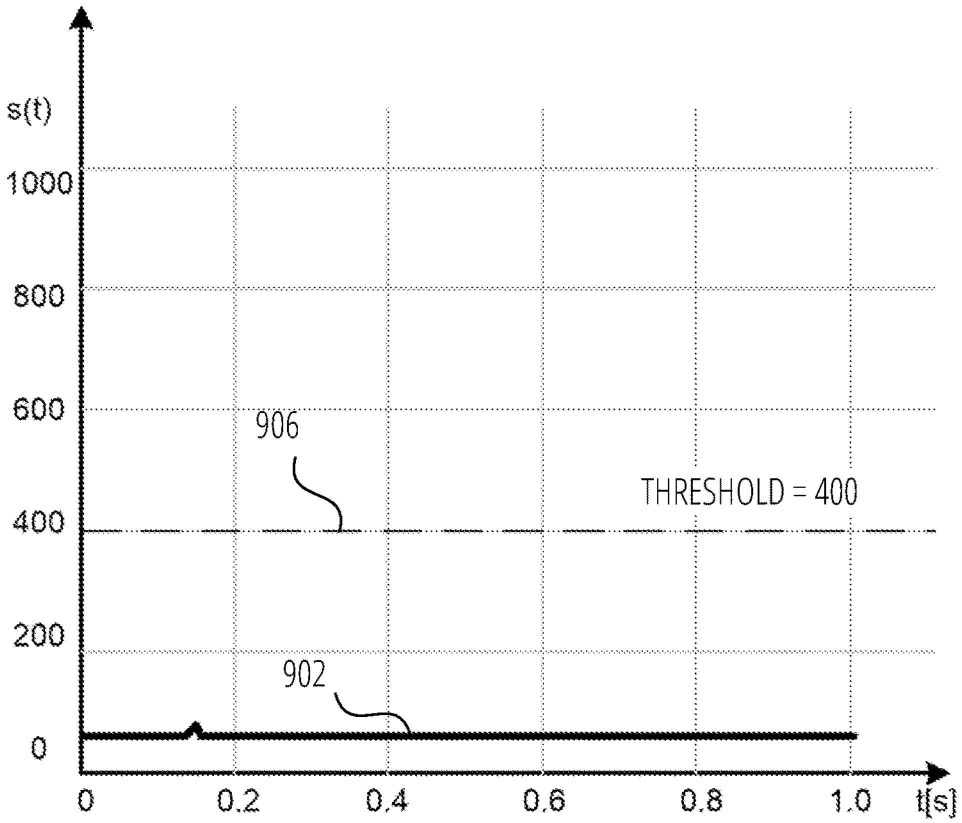
FIG. 9A is a plot of an example of average sum magnitudes without a moving object present.

FIG. 9A is a plot of an example of average sum magnitudes 902 of a sum (e.g., averages of magnitudes of the $SUM_1$ or $SUM_2$ of FIG. 1, averages of the CIR signal magnitudes 702, 706, 802, and 806 of FIG. 7A through FIG. 8B) (shown as s(t) in FIG. 9A) taken at various points in time t (horizontal axis) without a moving object present. For example, the average sum magnitudes 902 of FIG. 9 are taken every six milliseconds (6 ms) from time t=0 to time t=1. By way of non-limiting example, a predetermined pattern signal at a transmitter may be provided to a transmitter antenna. The predetermined pattern signal may include pulses spaced 256 ns apart, as illustrated in FIG. 2C. Since no moving object is present, a reflected predetermined pattern signal at the receiver may include relatively low magnitude pulses (e.g., undetectable pulses). Where no detectable pulses are present, antenna noise may be accumulated, which may, on average, result in a mean value of zero assuming white noise. Accordingly, the average magnitude of the sum of the collections of reflected predetermined pattern samples may be less than a predetermined threshold value 906 (e.g., threshold=400 in FIG. 9A), and no moving object therefore may be detected at each point in time t illustrated in FIG. 9A.

With a predetermined threshold value 906 (e.g., threshold=400 in FIG. 9A) applied to the average sum magnitudes 902, a moving object may be identified, or the movement itself may be analyzed to detect a movement direction. For example, a movement direction may be identified by obtaining magnitudes of sums (or equivalently CIR signal magnitudes, or E(t)) of collections of reflected predetermined pattern samples of more than one receiver by detecting a shift in peak positions between the CIR signal magnitudes. Gain control (GC) at the receivers (e.g., the receivers 104*a*, 104*b* of FIG. 1) may be set (e.g., via the GC signal 328 of FIG. 3) to a fixed level to suppress the noise signals in the reflected predetermined pattern samples.

The average sum s(t) (e.g., the average sum magnitudes 902) may be determined as follows:

$$s(t) = \frac{p}{n_{samples}} \sum_{k=0}^{n_{samples}-1} E(k)$$

where p is a fixed factor to adjust a range of the average sum magnitudes 902 to a predetermined range (e.g., from 0 to 1000), $n_{samples}$ is a number of samples in the predetermined time window (e.g., 256 samples, without limitation), and E(k) is the magnitude of the sums of the collections of reflected predetermined pattern samples, which are to be averaged.

Figure 9B:
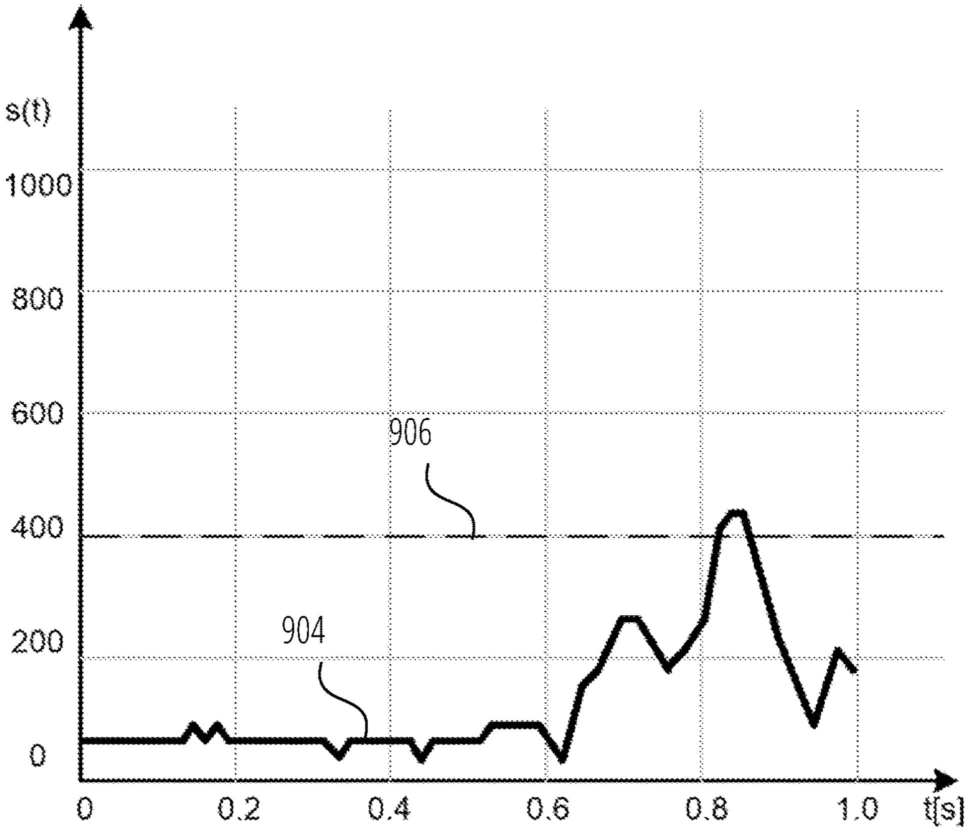
FIG. 9B is a plot of an example of average sum magnitudes with a moving object present.

FIG. 9B is a plot of an example of average sum magnitudes 904 of a sum over time with a moving object present. With the predetermined threshold value 906 applied to the average sum 904, a moving object may be identified. For example, the average sum 904 exceeds the predetermined threshold value 906 at a time of substantially 0.82 seconds in the plot of FIG. 9B. As a result, a moving object is detected (e.g., a trigger signal 330 of FIG. 3 may be provided) at time 0.82 seconds.

Figure 10:
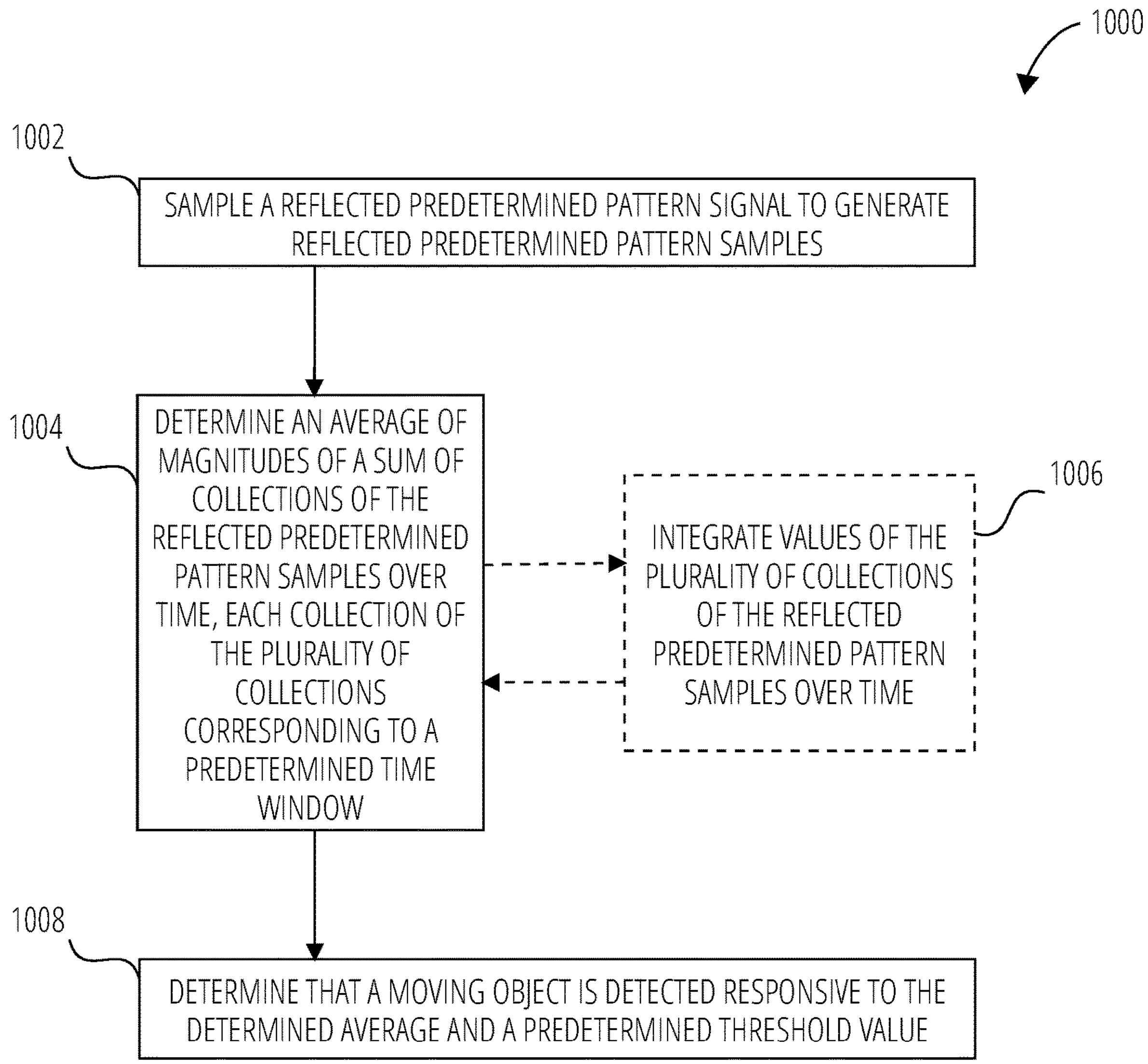
FIG. 10 is a flowchart illustrating a method of operating receiver processing circuitry, according to some examples.

FIG. 10 is a flowchart illustrating a method 1000 of operating receiver processing circuitry, according to some examples. At operation 1002, the method 1000 includes sampling a reflected predetermined pattern signal to generate reflected predetermined pattern samples.

At operation 1004, the method 1000 includes determining an average of magnitudes of a sum of collections of the reflected predetermined pattern samples over time, each collection of the plurality of collections corresponding to a predetermined time window. In some examples determining the average includes integrating values of the collections of reflected predetermined pattern samples over time (e.g., using the integrator 324 of FIG. 3) at operation 1006.

At operation 1008, the method 1000 includes determining that a moving object is detected responsive to the determined average sum and a predetermined threshold value.

Figure 11:
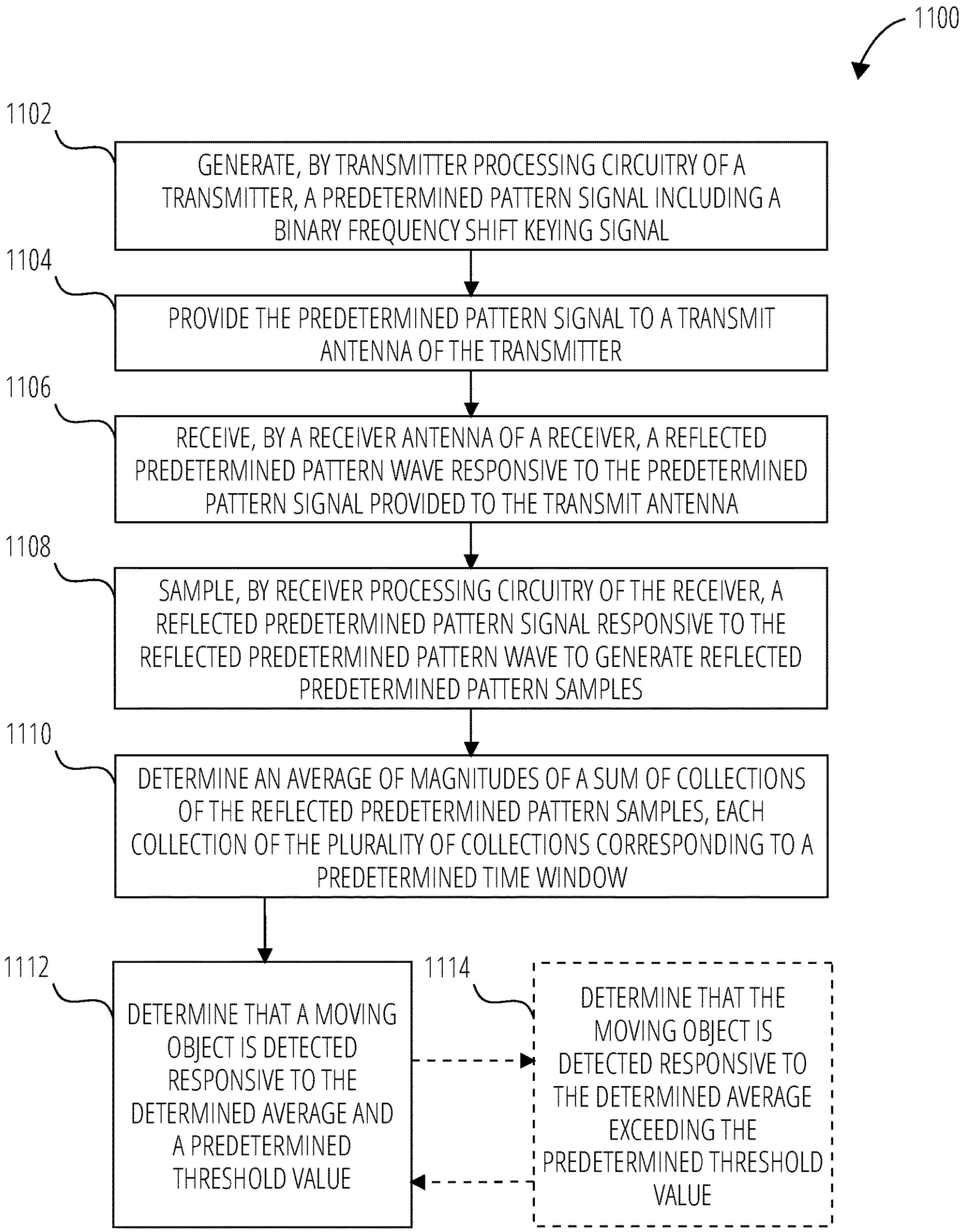
FIG. 11 is a flowchart illustrating a method of operating a radar system, according to some examples.

FIG. 11 is a flowchart illustrating a method 1100 of operating a radar system, according to some examples. At operation 1102, the method 1100 includes generating, by transmitter processing circuitry of a transmitter, a predetermined pattern signal (e.g., a preamble PR of a data telegram 200 of FIG. 2A) including a binary frequency shift keying signal. At operation 1104, the method 1100 includes providing the predetermined pattern signal to a transmit antenna of the transmitter.

At operation 1106, the method 1100 includes receiving, by a receiver antenna of a receiver, a reflected predetermined pattern wave responsive to the predetermined pattern signal provided to the transmit antenna. At operation 1108, the method 1100 includes sampling, by receiver processing circuitry of the receiver, a reflected predetermined pattern signal responsive to the reflected predetermined pattern wave to generate reflected predetermined pattern samples.

At operation 1110, the method 1100 includes determining an average of magnitudes of a sum of collections of the reflected predetermined pattern samples, each collection of the plurality of collections corresponding to a predetermined time window. At operation 1112, the method 1100 includes determining that a moving object is detected responsive to the determined average and a predetermined threshold value. In some examples, determining that the moving object is detected includes determining that the moving object is detected responsive to the determined average exceeding the predetermined threshold value at operation 1114.

Figure 12:
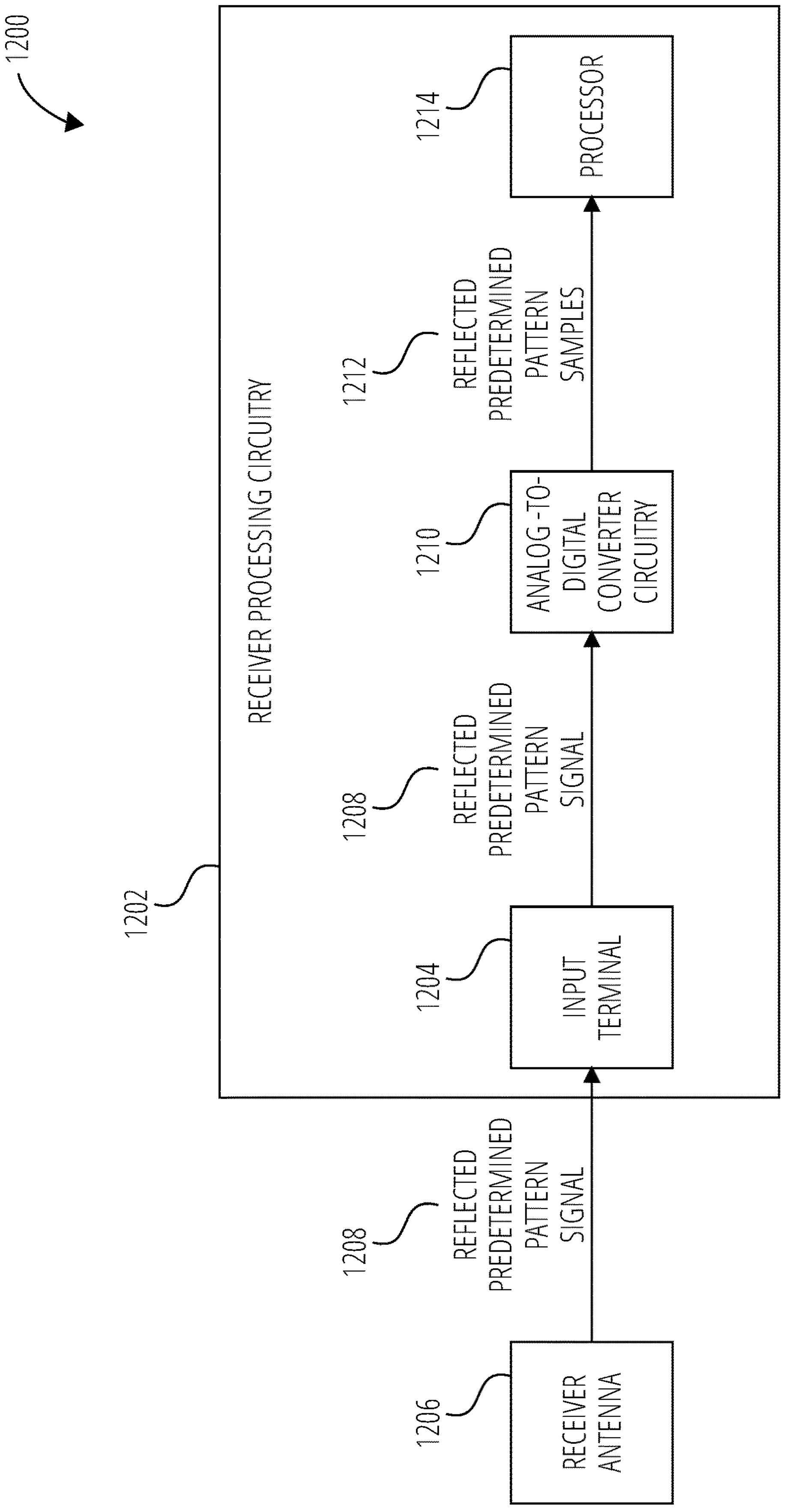
FIG. 12 is a block diagram of an apparatus, according to some examples.

FIG. 12 is a block diagram of an apparatus 1200, according to some examples. The apparatus 1200 includes a receiver antenna 1206 and a receiver processing circuitry 1202. The receiver processing circuitry 1202 is an example of the receiver processing circuitry 108*a* of FIG. 1 or the receiver processing circuitry 108*b* of FIG. 1. The receiver processing circuitry 1202 includes an input terminal 1204, an analog-to-digital converter (ADC) circuitry 1210, and a processor 1214. The input terminal 1204 receives a reflected predetermined pattern signal 1208 provided by the receiver antenna 1206, and delivers the reflected predetermined pattern signal 1208 to the ADC circuitry 1210. The ADC circuitry 1210 samples the reflected predetermined pattern signal 1208 received by the input terminal 1204 to generate reflected predetermined pattern samples 1212, and provides the reflected predetermined pattern samples 1212 to the processor 1214. The processor 1214 may perform any one or more of the methods 1300, 1400, 1500, or 1600, which are discussed in more detail below.

Figure 13:
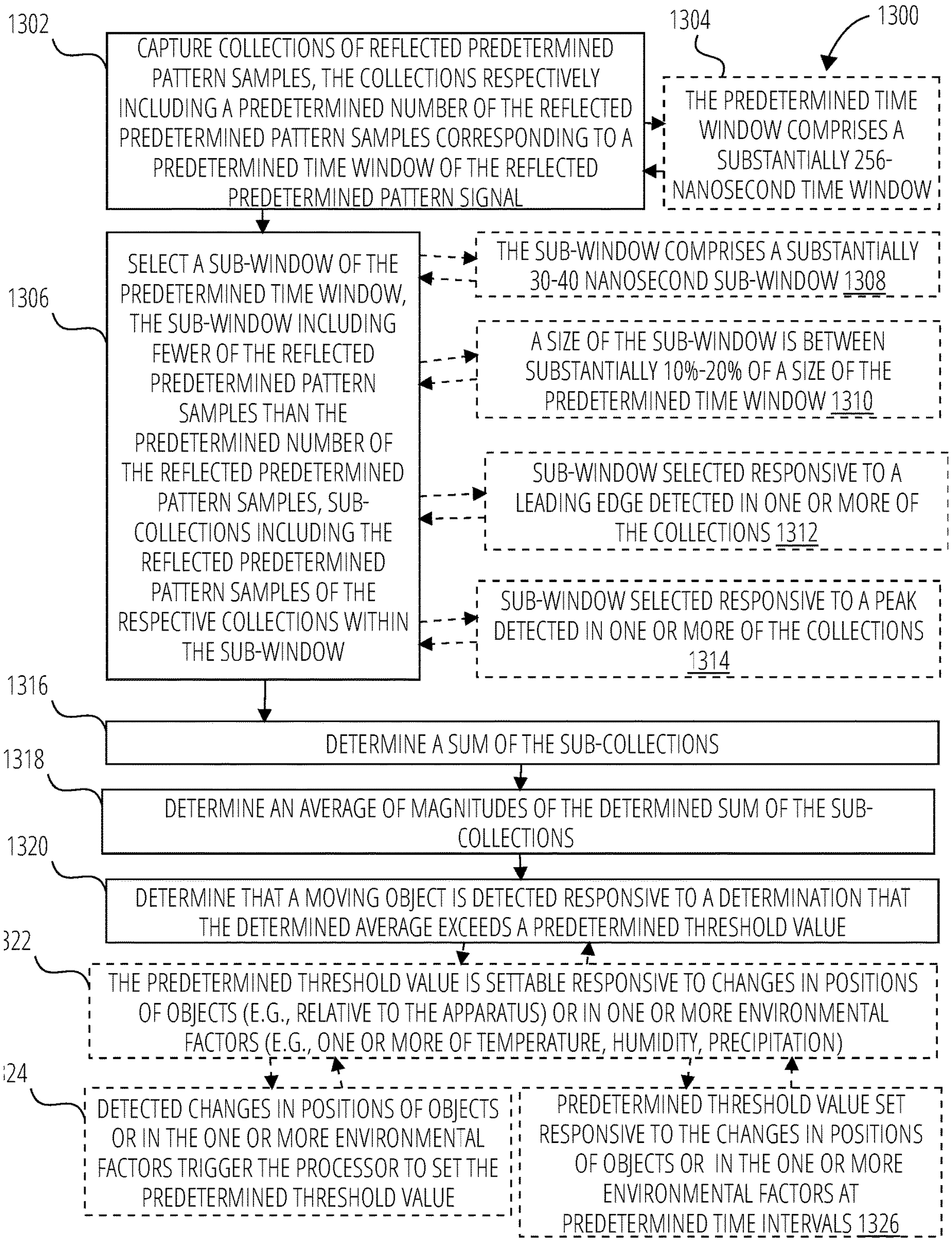
FIG. 13 is a flowchart illustrating a method of detecting a moving object using a sub-window of a predetermined time window, according to various examples.

FIG. 13 is a flowchart illustrating a method 1300 of detecting a moving object (e.g., the moving object 114 of FIG. 1, without limitation) using a sub-window of a predetermined time window, according to various examples. Referring to FIG. 12 and FIG. 13 together, at operation 1302, the method 1300 includes capturing collections of the reflected predetermined pattern samples 1212. The collections respectively include a predetermined number of the reflected predetermined pattern samples 1212 corresponding to a predetermined time window of the reflected predetermined pattern signal 1208. By way of non-limiting example 1304, the predetermined time window may comprise a substantially 256 nanosecond time window.

At operation 1306, the method 1300 includes selecting a sub-window of the predetermined time window. The sub-window includes fewer of the reflected predetermined pattern samples 1212 than the predetermined number of the reflected predetermined pattern samples 1212. Sub-collections are defined as collection of the reflected predetermined pattern samples 1212 of the respective collections within the sub-window. By way of non-limiting example 1308, the sub-window may comprise a substantially thirty nanosecond to a substantially forty nanosecond sub-window. As another non-limiting example 1310, a size of the sub-window may be between substantially ten percent and substantially twenty percent of a size of the predetermined time window. As yet another non-limiting example 1312, the sub-window may be selected responsive to a leading edge detected in one or more of the collections. As yet another non-limiting example 1314, the sub-window may be selected responsive to a peak detected in one or more of the collections.

At operation 1316, the method 1300 includes determining a sum of the sub-collections. At operation 1318, the method 1300 includes determining an average of magnitudes of the sum of the sub-collections determined in operation 1316.

At operation 1320, the method 1300 includes determining that a moving object is detected responsive to a determination that the determined average exceeds a predetermined threshold value. By way of non-limiting example 1322, the predetermined threshold value may be settable responsive to change in positions of objects (e.g., relative to the apparatus 1200, without limitation) or changes in one or more environmental factors (e.g., one or more of temperature, humidity, precipitation, without limitation). In some such examples, at operation 1324, detected changes in the one or more environmental factors or positions of objects, may trigger the processor to set the predetermined threshold value. Also, in some such examples, at operation 1326, the predetermined threshold value may be set responsive to the changes in the one or more environmental factors or positions of objects at predetermined time intervals.

Figure 14:
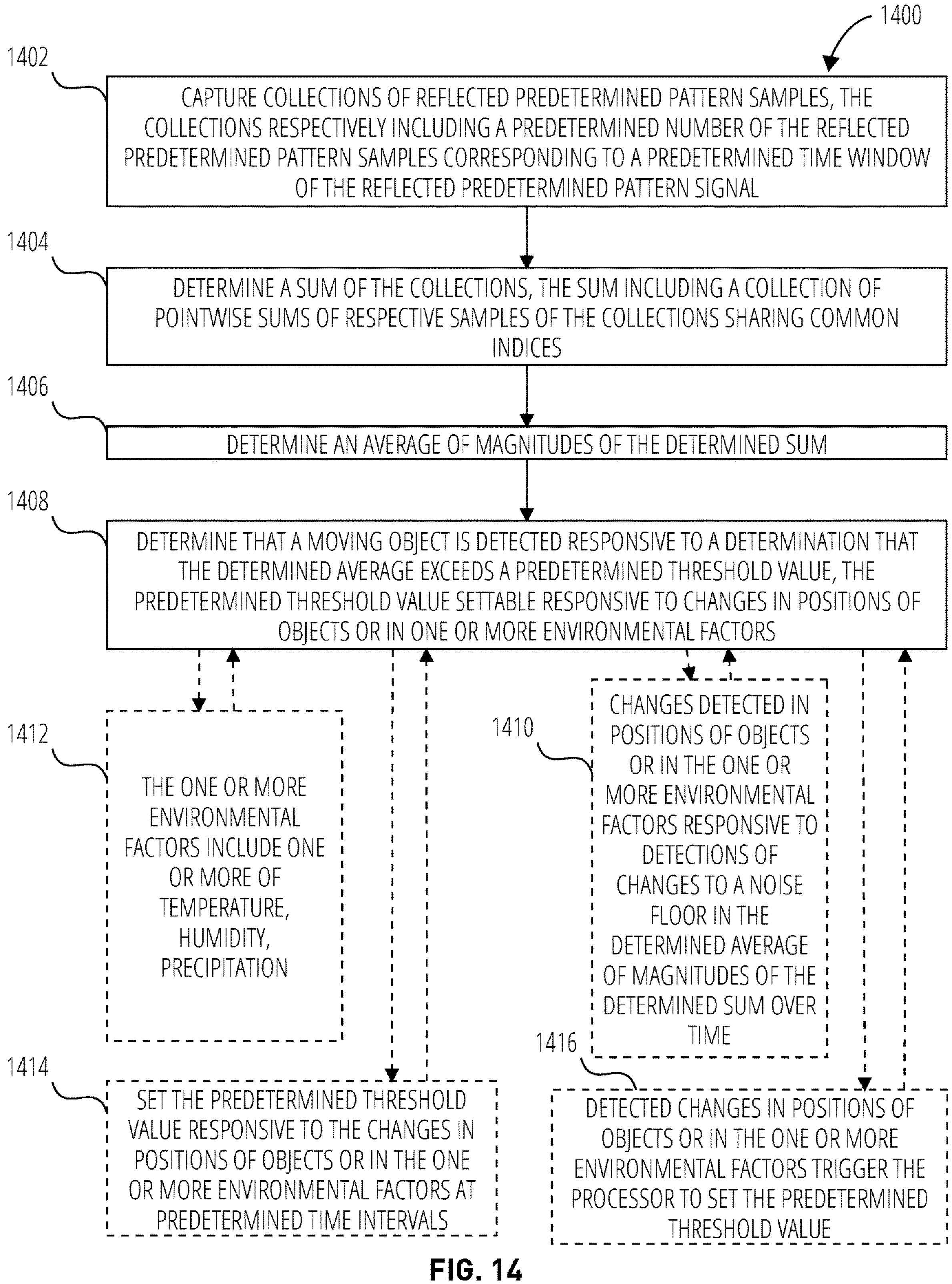
FIG. 14 is a flowchart illustrating a method of detecting a moving object using predetermined threshold value that is settable responsive to changes in one or more environmental factors, according to various examples.

FIG. 14 is a flowchart illustrating a method 1400 of detecting a moving object using a predetermined threshold value that is settable responsive to changes in one or more environmental factors or positions of objects, according to various examples. Referring to FIG. 12 and FIG. 14 together, at operation 1402, the method 1400 includes capturing collections of the reflected predetermined pattern samples 1212. The collections respectively include a predetermined number of the reflected predetermined pattern samples corresponding to a predetermined time window of the reflected predetermined pattern signal.

At operation 1404, the method 1400 includes determining a sum of the collections. At operation 1406, the method 1400 includes determining an average of magnitudes of the determined sum.

At operation 1408, the method 1400 includes determining that a moving object is detected responsive to a determination that the determined average exceeds a predetermined threshold value. The predetermined threshold value is settable responsive to changes in one or more environmental factors or positions of objects. By way of non-limiting example 1410, the one or more environmental factors may include one or more of temperature, humidity, precipitation. In some examples, at operation 1414, the method 1400 includes setting the predetermined threshold value includes setting the predetermined threshold value responsive to the changes in the one or more environmental factors or positions of objects at predetermined time intervals. In some examples, at operation 1412, the method 1400 includes detecting changes in the one or more environmental factors or positions of objects responsive to detections of changes to a noise floor in the determined average of magnitudes of the determined sum over time. By way of non-limiting example 1416, detected changes in the one or more environmental factors or positions of objects trigger the processor to set the predetermined threshold value.

Figure 15:
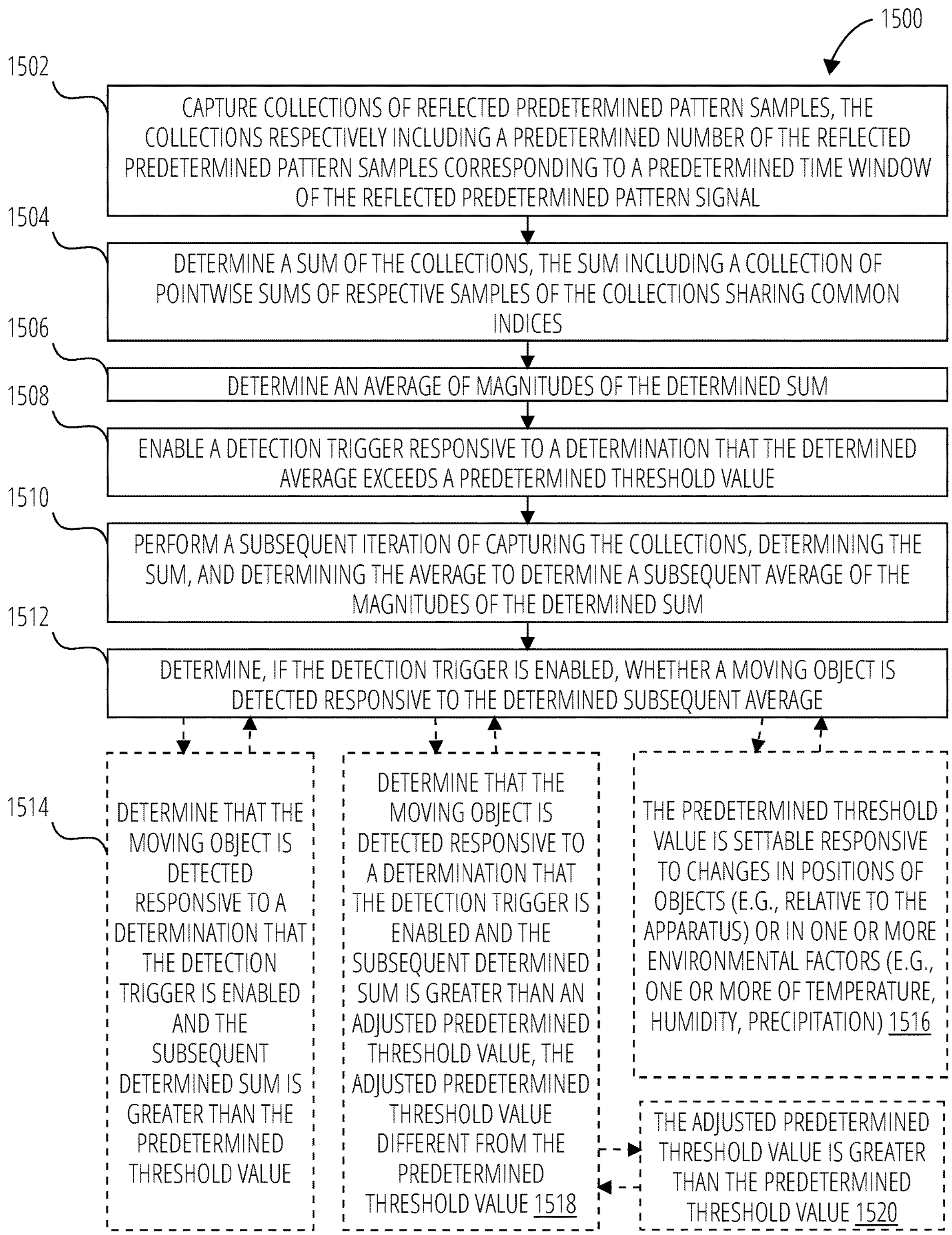
FIG. 15 is a flowchart illustrating a method of detecting a moving object using a detection trigger, according to various examples.

FIG. 15 is a flowchart illustrating a method 1500 of detecting a moving object using a detection trigger, according to various examples. Referring to FIG. 12 and FIG. 15 together, at operation 1502, the method 1500 includes capturing collections of the reflected predetermined pattern samples 1212, the collections respectively including a predetermined number of the reflected predetermined pattern samples 1212 corresponding to a predetermined time window of the reflected predetermined pattern signal.

At operation 1504, the method 1500 includes determining a sum of the collections. At operation 1506, the method 1500 includes determining an average of magnitudes of the determined sum. At operation 1508, the method 1500 includes enabling a detection trigger responsive to a determination that the determined average exceeds a predetermined threshold value. At operation 1510, the method 1500 includes performing a subsequent iteration of capturing the collections (operation 1502), determining the sum (operation 1504), and determining the average (operation 1506) to determine a subsequent average of the magnitudes of the determined sum.

At operation 1512, the method 1500 includes determining, if the detection trigger is enabled, whether a moving object is detected responsive to the determined subsequent average. In some examples determining whether a moving object is detected (operation 1512) includes operation 1514, determining that the moving object is detected responsive to a determination that the detection trigger is enabled and that the subsequent determined sum is greater than the predetermined threshold value. In one or more examples, method 1500 determines whether a moving object is detected responsive to the determined subsequent average only if the detection trigger is enabled. If the detection trigger is not enabled, method 1500 does not determine whether a moving object is detected responsive to the determined subsequent average.

In some examples determining whether a moving object is detected (operation 1512) includes operation 1518, determining that the moving object is detected responsive to a determination that the detection trigger is enabled and that the subsequent determined sum is greater than an adjusted predetermined threshold value. The adjusted predetermined threshold value is different from the predetermined threshold value. By way of non-limiting example 1520, the adjusted predetermined threshold value may be greater than the predetermined threshold value.

By way of non-limiting example 1516, the predetermined threshold value may be settable responsive to changes in positions of objects (e.g., relative to the apparatus 1200) or in one or more environmental factors (e.g., one or more of temperature, humidity, precipitation, without limitation).

Figure 16:
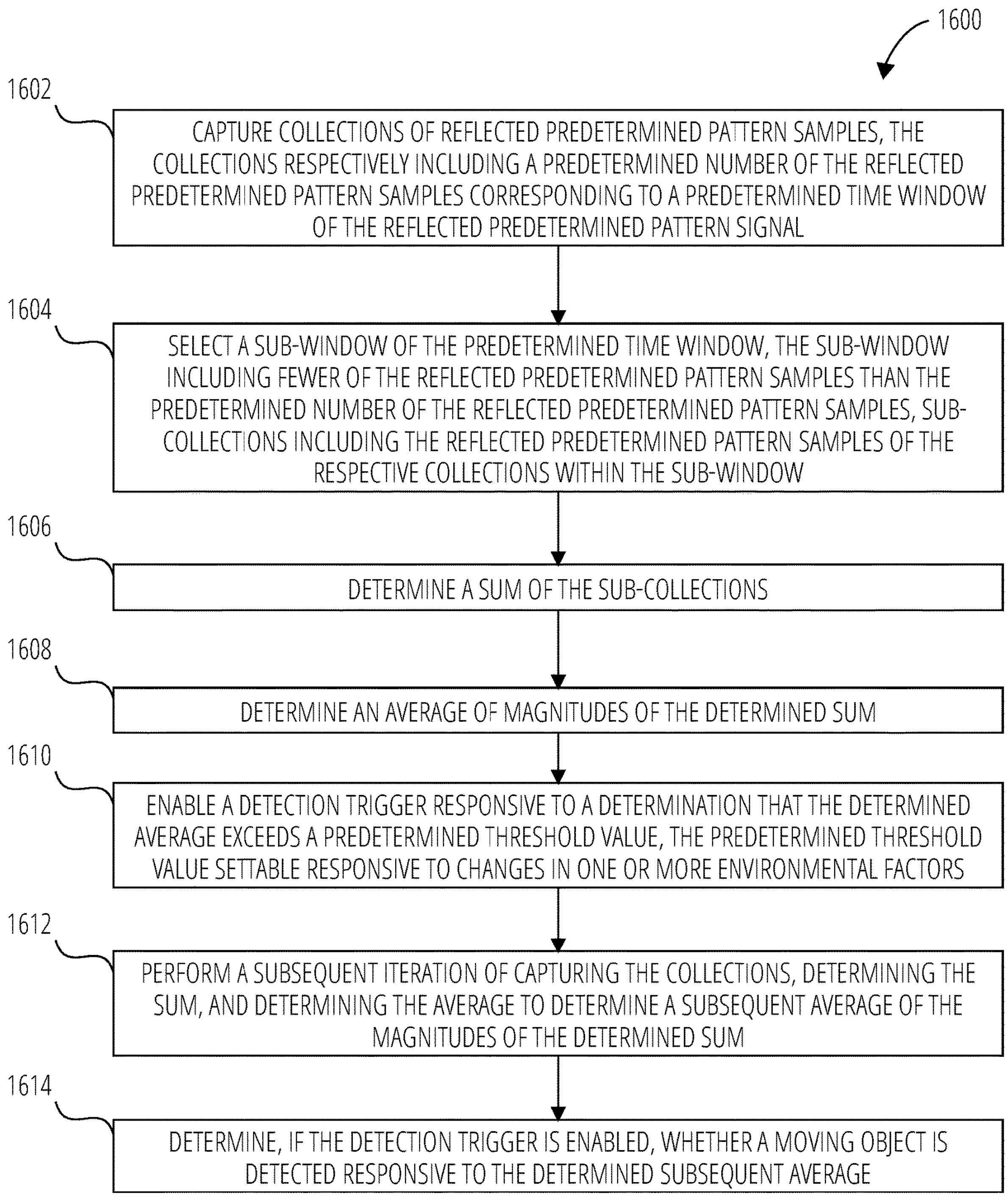
FIG. 16 is a flowchart illustrating a method of detecting a moving object using a sub-window of a predetermined time window, a predetermined threshold value that is settable responsive to changes in one or more environmental factors, and a detection trigger, according to various examples.

FIG. 16 is a flowchart illustrating a method 1600 of detecting a moving object using a sub-window of a predetermined time window, a predetermined threshold value that is settable responsive to changes positions of objects or in one or more environmental factors, and a detection trigger, according to various examples. Referring to FIG. 12 and FIG. 16 together, at operation 1602, the method 1600 includes capturing collections of the reflected predetermined pattern samples 1212. The collections respectively include a predetermined number of the reflected predetermined pattern samples 1212 corresponding to a predetermined time window of the reflected predetermined pattern signal.

At operation 1604, the 1600 includes selecting a sub-window of the predetermined time window. The sub-window includes fewer of the reflected predetermined pattern samples 1212 than the predetermined number of the reflected predetermined pattern samples 1212. Sub-collections include the reflected predetermined pattern samples of the respective collections within the sub-window.

At operation 1606, the method 1600 includes determining a sum of the sub-collections. At operation 1608, the method 1600 includes determining an average of magnitudes of the determined sum. At operation 1610, the method 1600 includes enabling a detection trigger responsive to a determination that the determined average exceeds a predetermined threshold value. The predetermined threshold value is settable responsive to changes in positions of objects or in one or more environmental factors. At operation 1612, the method 1600 includes performing a subsequent iteration of capturing the collections (operation 1602), determining the sum (operation 1606), and determining the average (operation 1608) to determine a subsequent average of the magnitudes of the determined sum. At operation 1614, the method 1600 includes determining, if the detection trigger is enabled, whether a moving object is detected responsive to the determined subsequent average. In one or more examples, method 1600 determines whether a moving object is detected responsive to the determined subsequent average only if the detection trigger is enabled. If the detection trigger is not enabled, method 1600 does not determine whether a moving object is detected responsive to the determined subsequent average.

Figure 17:
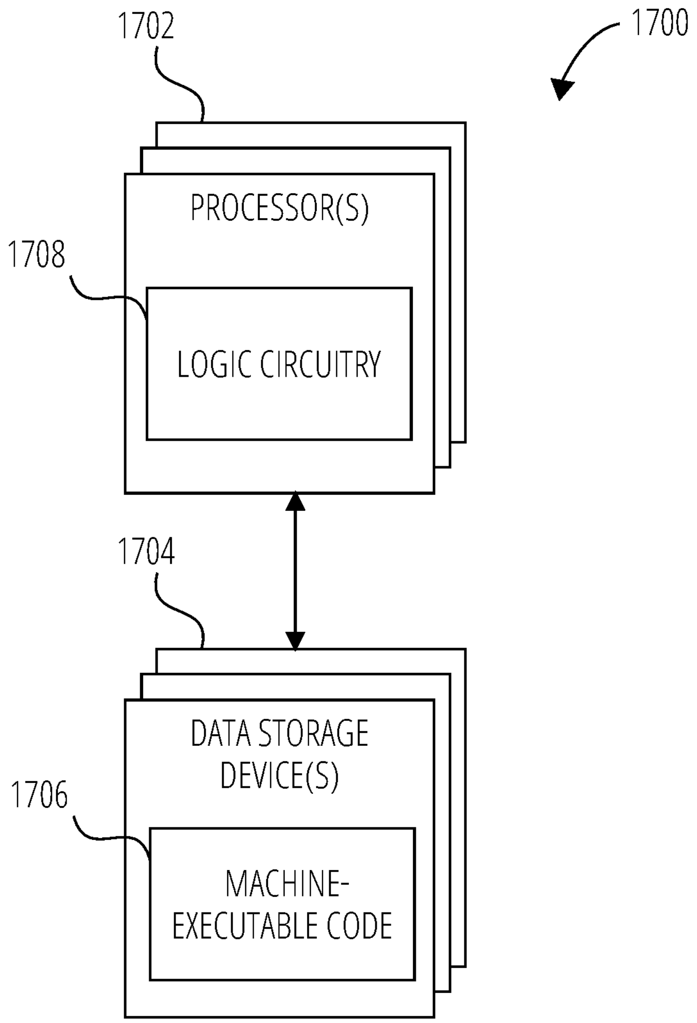
FIG. 17 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 17 illustrates non-limiting examples of implementations of functional elements disclosed herein. In some examples, some or all portions of the functional elements disclosed herein may be performed by hardware specially for carrying out the functional elements.

FIG. 17 is a block diagram of circuitry 1700 that, in some examples, may be used to implement various functions, operations, acts, processes, and/or methods disclosed herein. The circuitry 1700 includes one or more processors 1702 (sometimes referred to herein as "processors 1702") operably coupled to one or more data storage devices (sometimes referred to herein as "storage 1704"). The storage 1704 includes machine-executable code 1706 stored thereon and the processors 1702 include logic circuitry 1708. The machine-executable code 1706 includes information describing functional elements that may be implemented by (e.g., performed by) the logic circuitry 1708. The logic circuitry 1708 is adapted to implement (e.g., perform) the functional elements described by the machine-executable code 1706. The circuitry 1700, when executing the functional elements described by the machine-executable code 1706, should be considered as special purpose hardware for carrying out functional elements disclosed herein. In some examples, the processors 1702 may perform the functional elements described by the machine-executable code 1706 sequentially, concurrently (e.g., on one or more different hardware platforms), or in one or more parallel process streams.

When implemented by logic circuitry 1708 of the processors 1702, the machine-executable code 1706 is to adapt the processors 1702 to perform operations of examples disclosed herein. For example, the machine-executable code 1706 may be to adapt the processors 1702 to perform at least a portion or a totality of the method 1000 of FIG. 10, the method 1100 of FIG. 11, the method 1300 of FIG. 13, the method 1400 of FIG. 14, the method 1500 of FIG. 15, or the method 1600 of FIG. 16. As another example, the machine-executable code 1706 may be to adapt the processors 1702 to perform at least a portion or a totality of the operations discussed for the transmitter processing circuitry 106 of FIG. 1, the receiver processing circuitry 108*a*, 108*b* of FIG. 1, the receiver processing circuitry 300 of FIG. 3, the receiver processing circuitry 1202 of FIG. 12, or combinations thereof. As a specific, non-limiting example, the machine-executable code 1706 may be to adapt the processors 1702 to determine an average of magnitudes of a sum of collections of reflected predetermined pattern samples over a predetermined time window. As another specific, non-limiting example, the machine-executable code 1706 may be to adapt the processors 1702 to determine whether a moving object is sensed responsive to the determined average of magnitudes of the sum of the collections of reflected predetermined pattern samples and a predetermined threshold value.

The processors 1702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is to execute functional elements corresponding to the machine-executable code 1706 (e.g., software code, firmware code, hardware descriptions) related to examples of the present disclosure. It is noted that a general-purpose processor (may also be referred to herein as a host processor or simply a host) may be a microprocessor, but in the alternative, the processors 1702 may include any conventional processor, controller, microcontroller, or state machine. The processors 1702 may also be implemented as a combination of computing devices, such as a combination of a DSP and a microprocessor, a plurality of microprocessors, one or more microprocessors in conjunction with a DSP core, or any other such configuration.

In some examples, the storage 1704 includes volatile data storage (e.g., random-access memory (RAM)), non-volatile data storage (e.g., Flash memory, a hard disc drive, a solid state drive, erasable programmable read-only memory (EPROM), etc.). In some examples, the processors 1702 and the storage 1704 may be implemented into a single device (e.g., a semiconductor device product, a system on chip (SOC), etc.). In some examples, the processors 1702 and the storage 1704 may be implemented into separate devices.

In some examples, the machine-executable code 1706 may include computer-readable instructions (e.g., software code, firmware code). By way of non-limiting example, the computer-readable instructions may be stored by the storage 1704, accessed directly by the processors 1702, and executed by the processors 1702 using at least the logic circuitry 1708. Also by way of non-limiting example, the computer-readable instructions may be stored on the storage 1704, transferred to a memory device (not shown) for execution, and executed by the processors 1702 using at least the logic circuitry 1708. Accordingly, in some examples, the logic circuitry 1708 includes electrically configurable logic circuitry 1708.

In some examples, the machine-executable code 1706 may describe hardware (e.g., circuitry) to be implemented in the logic circuitry 1708 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large-scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1706 may include an HDL, an RTL, a GL description, a mask level description, other hardware description, or any combination thereof.

In examples where the machine-executable code 1706 includes a hardware description (at any level of abstraction), a system (not shown, but including the storage 1704) may be to implement the hardware description described by the machine-executable code 1706. By way of non-limiting example, the processors 1702 may include a programmable logic device (e.g., an FPGA or a PLC) and the logic circuitry 1708 may be electrically controlled to implement circuitry corresponding to the hardware description into the logic circuitry 1708. Also by way of non-limiting example, the logic circuitry 1708 may include hard-wired logic manufactured by a manufacturing system (not shown, but including the storage 1704) according to the hardware description of the machine-executable code 1706.

Regardless of whether the machine-executable code 1706 includes computer-readable instructions or a hardware description, the logic circuitry 1708 is adapted to perform the functional elements described by the machine-executable code 1706 when implementing the functional elements of the machine-executable code 1706. It is noted that although a hardware description may not directly describe functional elements, a hardware description indirectly describes functional elements that the hardware elements described by the hardware description are capable of performing.

EXAMPLES

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Example 1: An apparatus, comprising: an analog input terminal of a receiver processing circuitry, the analog input terminal to receive a reflected predetermined pattern signal provided by a receiver antenna; an analog-to-digital converter (ADC) circuitry to sample the reflected predetermined pattern signal received by the analog input terminal to generate reflected predetermined pattern samples; and a processor to: capture a plurality of collections of the reflected predetermined pattern samples, each collection of the plurality of collections including a predetermined number of the reflected predetermined pattern samples corresponding to a predetermined time window of the reflected predetermined pattern signal; determine an average of magnitudes of a sum of the plurality of collections of the reflected predetermined pattern samples; and determine whether a moving object is sensed responsive to the determined average and a predetermined threshold value.

Example 2: The apparatus of Example 1, the processor to: divide the determined average by a number of reflected predetermined pattern samples corresponding to the predetermined time window to generate a normalized average; and determine that the moving object is sensed responsive to the normalized average exceeding the predetermined threshold value.

Example 3: The apparatus of Example 1, the processor to determine that the moving object is sensed responsive to the determined average exceeding the predetermined threshold value.

Example 4: The apparatus according to any one of Examples 1-3, the receiver processing circuitry to operate asynchronously from a transmitter processing circuitry of a transmitter, the transmitter processing circuitry to generate a predetermined pattern signal to provide the reflected predetermined pattern signal responsive to reflection of a predetermined pattern wave corresponding to the predetermined pattern signal by one or more objects.

Example 5: The apparatus according to any one of Examples 1-4, the processor to adjust a gain of the receiver processing circuitry.

Example 6: The apparatus according to any one of Examples 1-5, the processor to determine the determined average by integrating the values of the collections of reflected predetermined pattern samples over time.

Example 7: The apparatus according to any one of Examples 1-6, wherein the reflected predetermined pattern signal includes a binary frequency shift keying signal.

Example 8: A system, comprising: a transmitter including a transmitter processing circuitry to generate a predetermined pattern signal; and one or more receivers, each including a respective receiver processing circuitry to: sample a reflected predetermined pattern signal to generate reflected predetermined pattern samples; determine an average of magnitudes of a sum of collections of the reflected predetermined pattern samples over time, each collection of the plurality of collections corresponding to a predetermined time window; and determine that a moving object is detected responsive to the determined average and a predetermined threshold value.

Example 9: The system of Example 8, wherein the predetermined pattern signal comprises a binary frequency shift keying signal.

Example 10: The system according to any one of Examples 8 and 9, wherein at least one of the one or more receivers operates asynchronously from the transmitter processing circuitry.

Example 11: The system according to any one of Examples 8-10, wherein the one or more receivers comprise a plurality of receivers, each of the plurality of receivers having a respective individual detection area associated therewith.

Example 12: The system of Example 11, wherein the plurality of receivers is positioned relative to a total detection area with the respective individual detection area associated with the each of the plurality of receivers in sum substantially covering the total detection area.

Example 13: The system according to any one of Examples 8-12, the respective receiver processing circuitry to determine that the moving object is detected responsive to the determined average exceeding the predetermined threshold value.

Example 14: The system according to any one of Examples 8-13, the one or more receivers to output a trigger signal responsive to a determination that the moving object is detected.

Example 15: The system of Example 14, comprising at least one of a vehicle trunk opening mechanism, a door opening mechanism, and an industrial automation controller to trigger responsive to the trigger signal.

Example 16: A method of operating receiver processing circuitry, the method comprising: sampling a reflected predetermined pattern signal to generate reflected predetermined pattern samples; determining an average of magnitudes of a sum of collections of the reflected predetermined pattern samples over time, each collection of the plurality of collections corresponding to a predetermined time window; and determining that a moving object is detected responsive to the determined average and a predetermined threshold value.

Example 17: The method of Example 16, wherein determining the average comprises integrating values of the plurality of collections of the reflected predetermined pattern samples.

Example 18: A method of operating a radar system, the method comprising: generating, by transmitter processing circuitry of a transmitter, a predetermined pattern signal including a binary frequency shift keying signal; providing the predetermined pattern signal to a transmit antenna of the transmitter; receiving, by a receiver antenna of a receiver, a reflected predetermined pattern wave responsive to the predetermined pattern signal provided to the transmit antenna; sampling, by receiver processing circuitry of the receiver, a reflected predetermined pattern signal responsive to the reflected predetermined pattern wave to generate reflected predetermined pattern samples; determining an average of magnitudes of a sum of collections of the reflected predetermined pattern samples over time, each collection of the plurality of collections corresponding to the predetermined time window; and determining that a moving object is detected responsive to the determined average and a predetermined threshold value.

Example 19: The method of Example 18, wherein determining that the moving object is detected comprises determining that the moving object is detected responsive to the determined average exceeding the predetermined threshold value.

Example 20: A receiver processing circuitry comprising: an analog input terminal configured to receive a reflected test pattern signal received via a receiver antenna; an analog-to-digital converter (ADC) circuitry configured to sample the reflected test pattern signal received by the analog input terminal to generate reflected test pattern samples; and a processor configured to: determine a sum of channel impulse response values over a predetermined time window responsive to the reflected test pattern samples; and determine whether a moving object is sensed responsive to the determined sum of the channel impulse response values and a predetermined threshold value.

Example 21: The receiver processing circuitry of Example 20, wherein the processing core is configured to determine whether the moving object is sensed responsive to the determined sum of the channel impulse response values and the predetermined threshold value by: dividing the sum of the channel impulse response values by a number of test pattern samples corresponding to the predetermined time window to generate a normalized sum; and determining that the moving object is sensed responsive to the normalized sum exceeding the predetermined threshold value.

Example 22: The receiver processing circuitry of Example 20, wherein the processing core is configured to determine whether the moving object is sensed responsive to the determined sum of the channel impulse response values and the predetermined threshold value by determining that the moving object is sensed responsive to the determined sum of the channel impulse response values exceeding the predetermined threshold value.

Example 23: The receiver processing circuitry according to any one of Examples 20-22, wherein the receiver processing circuitry is configured to operate asynchronously from transmitter processing circuitry of a transmitter, the transmitter processing circuitry configured to generate a test pattern signal to provide the reflected test pattern signal responsive to reflection of the test pattern signal by one or more objects.

Example 24: The receiver processing circuitry according to any one of Examples 20-23, wherein the processing core is configured to adjust a gain of the receiver.

Example 25: The receiver processing circuitry according to any one of Examples 20-24, wherein the processing core is configured to determine the sum of the channel impulse response values by integrating the channel impulse response values over the predetermined time window.

Example 26: The receiver processing circuitry according to any one of Examples 20-25, wherein the test pattern signal includes a binary frequency shift keying signal.

Example 27: A radar system, comprising: a transmitter including transmitter processing circuitry configured to generate a test pattern signal; and one or more receivers including receiver processing circuitry configured to: sample a reflected test pattern signal to generate reflected test pattern samples; determine a sum of channel impulse response values over a predetermined time window responsive to the reflected test pattern samples; and determine that a moving object is detected responsive to the sum of the channel impulse response values and a predetermined threshold value.

Example 28: The radar system of Example 27, wherein the test pattern signal comprises a binary frequency shift keying signal.

Example 29: The radar system according to any one of Examples 27 and 28, wherein at least one of the one or more receivers is configured to operate asynchronously from the transmitter processing circuitry.

Example 30: The radar system according to any one of Examples 27-29, wherein the one or more receivers comprise a plurality of receivers, each of the plurality of receivers having an individual detection area associated therewith.

Example 31: The radar system of Example 30, wherein the plurality of receivers are positioned relative to a total detection area with individual detection areas associated with the plurality of receivers substantially covering the total detection area.

Example 32: The radar system according to any one of Examples 27-31, wherein the receiver processing circuitry is configured to determine that the moving object is detect by: determining an average of the channel impulse response values responsive to the sum of the channel impulse response values; and determining that the moving object is detected responsive to the average of the channel impulse response values exceeding the predetermined threshold value.

Example 33: The radar system according to any one of Examples 27-32, wherein the receiver processing circuitry is configured to determine that the moving object is detect by determining that the moving object is detected responsive to the sum of channel impulse response values exceeding the predetermined threshold value.

Example 34: The radar system according to any one of Examples 27-33, further comprising a mechanism configured to trigger responsive to a determination that the moving object is detected.

Example 35: The radar system of Example 34, wherein the mechanism comprises a mechanism selected from the group consisting of a vehicle trunk opening mechanism, a door opening mechanism, and an industrial automation controller.

Example 36: A method of operating receiver processing circuitry, the method comprising: sampling a reflected test pattern signal to generate reflected test pattern samples; determining a sum of channel impulse response values over a predetermined time window responsive to the reflected test pattern samples; and determining that a moving object is detected responsive to the sum of the channel impulse response values and a predetermined threshold value.

Example 37: The method of Example 36, wherein determining the sum of channel impulse response values over the predetermined time window comprises integrating the reflected test pattern samples over the predetermined time window.

Example 38: A method of operating a radar system, the method comprising: generating, by transmitter processing circuitry of a transmitter, a test pattern signal including a binary frequency shift keying signal; providing the test pattern signal to a transmit antenna of the transmitter; receiving, by a receive antenna of a receiver, a reflected test pattern signal responsive to the test pattern signal provided to the transmit antenna; sampling, by receiver processing circuitry of the receiver, the reflected test pattern signal to generate reflected test pattern samples; determining a sum of channel impulse response values over a predetermined time window responsive to the reflected test pattern samples; and determining that a moving object is detected responsive to the sum of the channel impulse response values and a predetermined threshold value.

Example 39: The method of Example 38, wherein determining that the moving object is detected responsive to the sum of the channel impulse response values and the predetermined threshold value comprises determining an average of the channel impulse response values and determining that the moving object is detected responsive to the average exceeding the predetermined threshold value.

Additional non-limiting examples of the disclosure include:

Example 1: An apparatus, comprising: an input terminal to receive a reflected predetermined pattern signal provided by a receiver antenna; an analog-to-digital converter (ADC) circuitry to sample the reflected predetermined pattern signal received by the input terminal to generate reflected predetermined pattern samples; and a processor to: capture collections of the reflected predetermined pattern samples, the collections respectively including a predetermined number of the reflected predetermined pattern samples corresponding to a predetermined time window of the reflected predetermined pattern signal; select a sub-window of the predetermined time window, the sub-window including fewer of the reflected predetermined pattern samples than the predetermined number of the reflected predetermined pattern samples, sub-collections including the reflected predetermined pattern samples of the respective collections within the selected sub-window; determine a sum of the sub-collections; determine an average of magnitudes of the determined sum; and determine that a moving object is detected responsive to a determination that the determined average exceeds a predetermined threshold value.

Example 2: The apparatus according to Example 1, wherein the predetermined threshold value is settable responsive to changes in one or more environmental factors or change in positions of objects relative to the apparatus.

Example 3: The apparatus according to any of Examples 1 and 2, wherein the one or more environmental factors include one or more of temperature, humidity, precipitation.

Example 4: The apparatus according to any of Examples 1 through 3, wherein the processor sets the predetermined threshold value responsive to the changes in the one or more environmental factors or change in positions of objects relative to the apparatus at predetermined time intervals.

Example 5: The apparatus according to any of Examples 1 through 4, wherein detected changes in the one or more environmental factors or change in positions of objects relative to the apparatus trigger the processor to set the predetermined threshold value.

Example 6: The apparatus according to any of Examples 1 through 5, wherein the predetermined time window comprises a substantially 256 nanosecond time window and the sub-window comprises a substantially thirty nanosecond to a substantially forty nanosecond sub-window.

Example 7: The apparatus according to any of Examples 1 through 6, wherein a size of the sub-window is between substantially ten percent and substantially twenty percent of a size of the predetermined time window.

Example 8: The apparatus according to any of Examples 1 through 7, wherein the processor selects the sub-window responsive to a leading edge detected in one or more of the collections.

Example 9: The apparatus according to any of Examples 1 through 8, wherein the processor selects the sub-window responsive to a peak detected in one or more of the collections.

Example 10: An apparatus, comprising: an input terminal to receive a reflected predetermined pattern signal provided by a receiver antenna; an analog-to-digital converter (ADC) circuitry to sample the reflected predetermined pattern signal received by the input terminal to generate reflected predetermined pattern samples; and a processor to: capture collections of the reflected predetermined pattern samples, the collections respectively including a predetermined number of the reflected predetermined pattern samples corresponding to a predetermined time window of the reflected predetermined pattern signal; determine a sum of the collections; determine an average of magnitudes of the determined sum; and determine that a moving object is detected responsive to a determination that the determined average exceeds a predetermined threshold value, the predetermined threshold value settable responsive to changes in one or more environmental factors or change in positions of objects relative to the apparatus.

Example 11: The apparatus according to Example 10, wherein the one or more environmental factors include one or more of temperature, humidity, or precipitation.

Example 12: The apparatus according to any of Examples 10 and 11, wherein the processor detects the changes in the one or more environmental factors responsive to detections of changes to a noise floor in the determined average of magnitudes of the determined sum over time.

Example 13: The apparatus according to any of Examples 10 through 12, wherein the processor sets the predetermined threshold value responsive to the changes in the one or more environmental factors or change in positions of objects relative to the apparatus at predetermined time intervals.

Example 14: The apparatus according to any of Examples 10 through 13, wherein detected changes in the one or more environmental factors or change in positions of objects relative to the apparatus trigger the processor to set the predetermined threshold value.

Example 15: An apparatus, comprising: an input terminal to receive a reflected predetermined pattern signal provided by a receiver antenna; an analog-to-digital converter (ADC) circuitry to sample the reflected predetermined pattern signal received by the input terminal to generate reflected predetermined pattern samples; and a processor to: capture collections of the reflected predetermined pattern samples, the collections respectively including a predetermined number of the reflected predetermined pattern samples corresponding to a predetermined time window of the reflected predetermined pattern signal; determine a sum of the collections; determine an average of magnitudes of the determined sum; enable a detection trigger responsive to a determination that the determined average exceeds a predetermined threshold value; perform a subsequent iteration of capturing the collections, determining the sum, and determining the average to determine a subsequent average of the magnitudes of the determined sum; and determine, responsive to the detection trigger being enabled, whether a moving object is detected responsive to the determined subsequent average.

Example 16: The apparatus according to Example 15, wherein the processor determines that the moving object is detected responsive to a determination that the detection trigger is enabled and the subsequent determined sum is greater than the predetermined threshold value.

Example 17: The apparatus according to any of Examples 15 and 16, wherein the processor determines that the moving object is detected responsive to a determination that the detection trigger is enabled and the subsequent determined sum is greater than an adjusted predetermined threshold value, the adjusted predetermined threshold value different from the predetermined threshold value.

Example 18: The apparatus according to any of Examples 15 through 17, wherein the adjusted predetermined threshold value is greater than the predetermined threshold value.

Example 19: The apparatus according to any of Examples 15 through 18, wherein the predetermined threshold value is settable responsive to changes in one or more environmental factors or change in positions of objects relative to the apparatus.

Example 20: The apparatus according to any of Examples 15 through 19, wherein the one or more environmental factors include one or more of temperature, humidity, or precipitation.

Example 21: An apparatus, comprising: an input terminal to receive a reflected predetermined pattern signal provided by a receiver antenna; an analog-to-digital converter (ADC) circuitry to sample the reflected predetermined pattern signal received by the input terminal to generate reflected predetermined pattern samples; and a processor to: capture collections of the reflected predetermined pattern samples, the collections respectively including a predetermined number of the reflected predetermined pattern samples corresponding to a predetermined time window of the reflected predetermined pattern signal; select a sub-window of the predetermined time window, the sub-window including fewer of the reflected predetermined pattern samples than the predetermined number of the reflected predetermined pattern samples, sub-collections including the reflected predetermined pattern samples of the respective collections within the sub-window; determine a sum of the sub-collections; determine an average of magnitudes of the determined sum; enable a detection trigger responsive to a determination that the determined average exceeds a predetermined threshold value, the predetermined threshold value settable responsive to changes in one or more environmental factors; perform a subsequent iteration of capturing the collections, determining the sum, and determining the average to determine a subsequent average of the magnitudes of the determined sum; and determine, responsive to the detection trigger being enabled, whether a moving object is detected responsive to the determined subsequent average.

As used in the present disclosure, the terms “module” or “component” may refer to specific hardware implementations to perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term “combination” with reference to a plurality of elements may include a combination of all the elements or any of various different sub-combinations of some of the elements. For example, the phrase “A, B, C, D, or combinations thereof” may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as “open” terms (e.g., the term “including” should be interpreted as “including, but not limited to,” the term “having” should be interpreted as “having at least,” the term “includes” should be interpreted as “includes, but is not limited to,” etc.). As used herein the term “each” means some or a totality, and the term “each and every” means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:

an input terminal to receive a reflected predetermined pattern signal provided by a receiver antenna;

an analog-to-digital converter (ADC) circuitry to sample the reflected predetermined pattern signal received by the input terminal to generate reflected predetermined pattern samples; and a processor to:

capture collections of the reflected predetermined pattern samples, the collections respectively including a predetermined number of the reflected predetermined pattern samples corresponding to a predetermined time window of the reflected predetermined pattern signal;

select a sub-window of the predetermined time window, the sub-window including fewer of the reflected predetermined pattern samples than the predetermined number of the reflected predetermined pattern samples, sub-collections including the reflected predetermined pattern samples of the respective collections within the selected sub-window;

determine a sum of the sub-collections;

determine an average of magnitudes of the determined sum; and determine that a moving object is detected responsive to a determination that the determined average exceeds a predetermined threshold value.

2. The apparatus of claim 1, wherein the predetermined threshold value is settable responsive to changes in one or more environmental factors or change in positions of objects relative to the apparatus.

3. The apparatus of claim 2, wherein when the predetermined threshold value is settable responsive to changes in one or more environmental factors, the one or more environmental factors include one or more of temperature, humidity, precipitation.

4. The apparatus of claim 2, wherein the processor sets the predetermined threshold value responsive to the changes in the one or more environmental factors or change in positions of objects relative to the apparatus at predetermined time intervals.

5. The apparatus of claim 2, wherein detected changes in the one or more environmental factors or change in positions of objects relative to the apparatus trigger the processor to set the predetermined threshold value.

6. The apparatus of claim 1, wherein a size of the sub-window is between substantially ten percent and substantially twenty percent of a size of the predetermined time window.

7. The apparatus of claim 1, wherein the processor selects the sub-window responsive to a peak detected in one or more of the collections.

8. An apparatus, comprising:

an input terminal to receive a reflected predetermined pattern signal provided by a receiver antenna;

an analog-to-digital converter (ADC) circuitry to sample the reflected predetermined pattern signal received by the input terminal to generate reflected predetermined pattern samples; and a processor to:

capture collections of the reflected predetermined pattern samples, the collections respectively including a predetermined number of the reflected predetermined pattern samples corresponding to a predetermined time window of the reflected predetermined pattern signal;

select a sub-window of the predetermined time window, the sub-window including fewer of the reflected predetermined pattern samples than the predetermined number of the reflected predetermined pattern samples, sub-collections including the reflected predetermined pattern samples of the respective collections within the selected sub-window;

determine a sum of the sub-collections;

determine an average of magnitudes of the determined sum; and determine that a moving object is detected responsive to a determination that the determined average exceeds a predetermined threshold value, wherein the predetermined time window comprises a substantially 256 nanosecond time window and the sub-window comprises a substantially thirty nanosecond to a substantially forty nanosecond sub-window.

9. An apparatus, comprising:
an input terminal to receive a reflected predetermined pattern signal provided by a receiver antenna;
an analog-to-digital converter (ADC) circuitry to sample the reflected predetermined pattern signal received by the input terminal to generate reflected predetermined pattern samples; and
a processor to:
capture collections of the reflected predetermined pattern samples, the collections respectively including a predetermined number of the reflected predetermined pattern samples corresponding to a predetermined time window of the reflected predetermined pattern signal;
select a sub-window of the predetermined time window, the sub-window including fewer of the reflected predetermined pattern samples than the predetermined number of the reflected predetermined pattern samples, sub-collections including the reflected predetermined pattern samples of the respective collections within the selected sub-window;
determine a sum of the sub-collections;
determine an average of magnitudes of the determined sum; and
determine that a moving object is detected responsive to a determination that the determined average exceeds a predetermined threshold value,
wherein the processor selects the sub-window responsive to a leading edge detected in one or more of the collections.

10. An apparatus, comprising:
an input terminal to receive a reflected predetermined pattern signal provided by a receiver antenna;
an analog-to-digital converter (ADC) circuitry to sample the reflected predetermined pattern signal received by the input terminal to generate reflected predetermined pattern samples; and
a processor to:
capture collections of the reflected predetermined pattern samples, the collections respectively including a predetermined number of the reflected predetermined pattern samples corresponding to a predetermined time window of the reflected predetermined pattern signal;
determine a sum of the collections;
determine an average of magnitudes of the determined sum; and
determine that a moving object is detected responsive to a determination that the determined average exceeds a predetermined threshold value, the predetermined threshold value settable responsive to changes in one or more environmental factors or change in positions of objects relative to the apparatus.

11. The apparatus of claim 10, wherein when the predetermined threshold value is settable responsive to changes in one or more environmental factors, the one or more environmental factors include one or more of temperature, humidity, or precipitation.

12. The apparatus of claim 10, wherein when the predetermined threshold value is settable responsive to changes in one or more environmental factors, the processor detects the changes in the one or more environmental factors responsive to detections of changes to a noise floor in the determined average of magnitudes of the determined sum over time.

13. The apparatus of claim 10, wherein the processor sets the predetermined threshold value responsive to the changes in the one or more environmental factors or change in positions of objects relative to the apparatus at predetermined time intervals.

14. The apparatus of claim 10, wherein detected changes in the one or more environmental factors or change in positions of objects relative to the apparatus trigger the processor to set the predetermined threshold value.

15. An apparatus, comprising:
an input terminal to receive a reflected predetermined pattern signal provided by a receiver antenna;
an analog-to-digital converter (ADC) circuitry to sample the reflected predetermined pattern signal received by the input terminal to generate reflected predetermined pattern samples; and
a processor to:
capture collections of the reflected predetermined pattern samples, the collections respectively including a predetermined number of the reflected predetermined pattern samples corresponding to a predetermined time window of the reflected predetermined pattern signal;
determine a sum of the collections;
determine an average of magnitudes of the determined sum;
enable a detection trigger responsive to a determination that the determined average exceeds a predetermined threshold value;
perform a subsequent iteration of capturing the collections, determining the sum, and determining the average to determine a subsequent average of the magnitudes of the determined sum; and
determine, responsive to the detection trigger being enabled, whether a moving object is detected responsive to the determined subsequent average.

16. The apparatus of claim 15, wherein the processor determines that the moving object is detected responsive to a determination that the detection trigger is enabled and the subsequent determined sum is greater than the predetermined threshold value.

17. The apparatus of claim 15, wherein the processor determines that the moving object is detected responsive to a determination that the detection trigger is enabled and the subsequent determined sum is greater than an adjusted predetermined threshold value, the adjusted predetermined threshold value different from the predetermined threshold value.

18. The apparatus of claim 17, wherein the adjusted predetermined threshold value is greater than the predetermined threshold value.

19. The apparatus of claim 15, wherein the predetermined threshold value is settable responsive to changes in one or more environmental factors or change in positions of objects relative to the apparatus.

20. The apparatus of claim 19, wherein when the predetermined threshold value is settable responsive to changes in one or more environmental factors, the one or more environmental factors include one or more of temperature, humidity, or precipitation.

21. An apparatus, comprising:
an input terminal to receive a reflected predetermined pattern signal provided by a receiver antenna;
an analog-to-digital converter (ADC) circuitry to sample the reflected predetermined pattern signal received by the input terminal to generate reflected predetermined pattern samples; and a processor to:

capture collections of the reflected predetermined pattern samples, the collections respectively including a predetermined number of the reflected predetermined pattern samples corresponding to a predetermined time window of the reflected predetermined pattern signal;

select a sub-window of the predetermined time window, the sub-window including fewer of the reflected predetermined pattern samples than the predetermined number of the reflected predetermined pattern samples, sub-collections including the reflected predetermined pattern samples of the respective collections within the sub-window;

determine a sum of the sub-collections;

determine an average of magnitudes of the determined sum;

enable a detection trigger responsive to a determination that the determined average exceeds a predetermined threshold value, the predetermined threshold value settable responsive to changes in one or more environmental factors;

perform a subsequent iteration of capturing the collections, determining the sum, and determining the average to determine a subsequent average of the magnitudes of the determined sum; and determine, responsive to the detection trigger being enabled, whether a moving object is detected responsive to the determined subsequent average.

* * * * *